United States Patent
Murakawa et al.

(10) Patent No.: US 12,451,737 B2
(45) Date of Patent: Oct. 21, 2025

(54) ROTATING ELECTRICAL MACHINE, STATOR CORE AND ROTOR CORE SET, METHOD FOR MANUFACTURING ROTATING ELECTRICAL MACHINE, METHOD FOR MANUFACTURING NON-ORIENTED ELECTRICAL STEEL SHEET FOR STATOR AND NON-ORIENTED ELECTRICAL STEEL SHEET FOR ROTOR, METHOD FOR MANUFACTURING STATOR AND ROTOR, AND NON-ORIENTED ELECTRICAL STEEL SHEET SET

(71) Applicant: NIPPON STEEL CORPORATION, Tokyo (JP)

(72) Inventors: Tesshu Murakawa, Tokyo (JP); Yoshiaki Natori, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 28 days.

(21) Appl. No.: 18/278,761

(22) PCT Filed: Mar. 30, 2022

(86) PCT No.: PCT/JP2022/016049
§ 371 (c)(1),
(2) Date: Aug. 24, 2023

(87) PCT Pub. No.: WO2022/210895
PCT Pub. Date: Oct. 6, 2022

(65) Prior Publication Data
US 2024/0154472 A1    May 9, 2024

(30) Foreign Application Priority Data

Mar. 31, 2021 (JP) ................................. 2021-061620
Jun. 4, 2021 (JP) ................................. 2021-094807

(51) Int. Cl.
*H02K 1/02* (2006.01)
*C21D 6/00* (2006.01)
(Continued)

(52) U.S. Cl.
CPC ............... *H02K 1/02* (2013.01); *C21D 6/001* (2013.01); *C21D 6/002* (2013.01); *C21D 6/005* (2013.01);
(Continued)

(58) Field of Classification Search
CPC ...... C21D 1/30; C21D 2261/00; C21D 6/001; C21D 6/002; C21D 6/005; C21D 6/008;
(Continued)

(56) References Cited

U.S. PATENT DOCUMENTS

2021/0371948 A1* 12/2021 Zaizen ................. C22C 38/002
2022/0294279 A1    9/2022 Noguchi et al.

FOREIGN PATENT DOCUMENTS

DE    10 2012 005 969 A1    9/2013
JP    3492075 B2    2/2004
(Continued)

OTHER PUBLICATIONS

Hata et al., "Development of a New Hybrid Transmission for FWD Sports Utility Vehicles", SAE Technical Paper Series, 2005-01-0272, 2005, total 9 pages.
(Continued)

*Primary Examiner* — Jenny R Wu
(74) *Attorney, Agent, or Firm* — Birch, Stewart, Kolasch & Birch, LLP

(57) ABSTRACT

The rotating electrical machine includes a stator, a rotor, and a casing that accommodates the stator and the rotor, in which at least one of the following conditions 1 and 2 is satisfied. Condition 1: a thermal conductivity A of a non-oriented electrical steel sheet that is used for a core of the stator
(Continued)

is in a range of 12 to 35 W/(m·K), a thermal conductivity B of a non-oriented electrical steel sheet that is used for a core of the rotor is in a range of 10 to 33 W/(m·K), and both the thermal conductivities have a relationship of an expression (1) of A>B Condition 2: a thermal diffusivity A1 of the non-oriented electrical steel sheet that is used for the core of the stator is in a range of $3.0 \times 10^{-6}$ to $9.0 \times 10^{-6}$ m$^2$/sW/(m·K), a thermal diffusivity B1 of the non-oriented electrical steel sheet that is used for the core of the rotor is in a range of $2.5 \times 10^{-6}$ to $8.5 \times 10^{-6}$ m$^2$/sW/(m·K), and both the thermal diffusivities have a relationship of an expression (3) of A1>B1.

24 Claims, 1 Drawing Sheet

(51) Int. Cl.
| | |
|---|---|
| *C21D 8/12* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/14* | (2006.01) |
| *C22C 38/16* | (2006.01) |
| *C22C 38/34* | (2006.01) |
| *C22C 38/60* | (2006.01) |
| *H01F 1/147* | (2006.01) |
| *H01F 41/02* | (2006.01) |

(52) U.S. Cl.
CPC ............ *C21D 6/008* (2013.01); *C21D 8/1222* (2013.01); *C21D 8/1233* (2013.01); *C21D 8/1261* (2013.01); *C21D 8/1277* (2013.01); *C21D 9/46* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/14* (2013.01); *C22C 38/16* (2013.01); *C22C 38/34* (2013.01); *C22C 38/60* (2013.01); *H01F 1/14783* (2013.01); *H01F 41/02* (2013.01); *C22C 2202/02* (2013.01)

(58) Field of Classification Search
CPC .. C21D 8/1222; C21D 8/1233; C21D 8/1261; C21D 8/1272; C21D 8/1277; C21D 9/46; C22C 2202/02; C22C 38/00; C22C 38/001; C22C 38/002; C22C 38/004; C22C 38/005; C22C 38/008; C22C 38/02; C22C 38/04; C22C 38/06; C22C 38/08; C22C 38/14; C22C 38/16; C22C 38/18; C22C 38/20; C22C 38/34; C22C 38/42; C22C 38/50; C22C 38/54; C22C 38/58; C22C 38/60; H01F 1/14775; H01F 1/14783; H01F 1/16; H01F 41/02; H01F 41/0233; H02K 1/02; H02K 21/14; H02K 2213/03
See application file for complete search history.

(56) References Cited

FOREIGN PATENT DOCUMENTS

| | | |
|---|---|---|
| JP | 5598062 B2 | 10/2014 |
| WO | WO 2020/090160 A1 | 5/2020 |
| WO | WO 2021/033567 A1 | 2/2021 |

OTHER PUBLICATIONS

Kamiya, "Study on High Power Density of HV Drive Motor", Doctoral Thesis, 2008, total 133 pages.

Onimaru et al., "Thermal Analysis of Motor Cooling Structure to Use ATF for Hybrid Electric Vehicle (HEV)", Society of Automotive Engineers of Japan, Academic Lecture preprint, 2006, No. 68-06, pp. 19-24.

Huang et al., "Thermal Characteristics Analysis of Single-Winding Bearingless Switched Reluctance Motor," Progress in Electromagnetics Research M, vol. 86, Oct. 23, 2019, pp. 59-69.

Lide, "CRC Handbook of Chemistry and Physics," 90th ed., https://en.wikipedia.org/wiki/Thermal_diffusivity, Jun. 3, 2009, 10 pages total.

\* cited by examiner

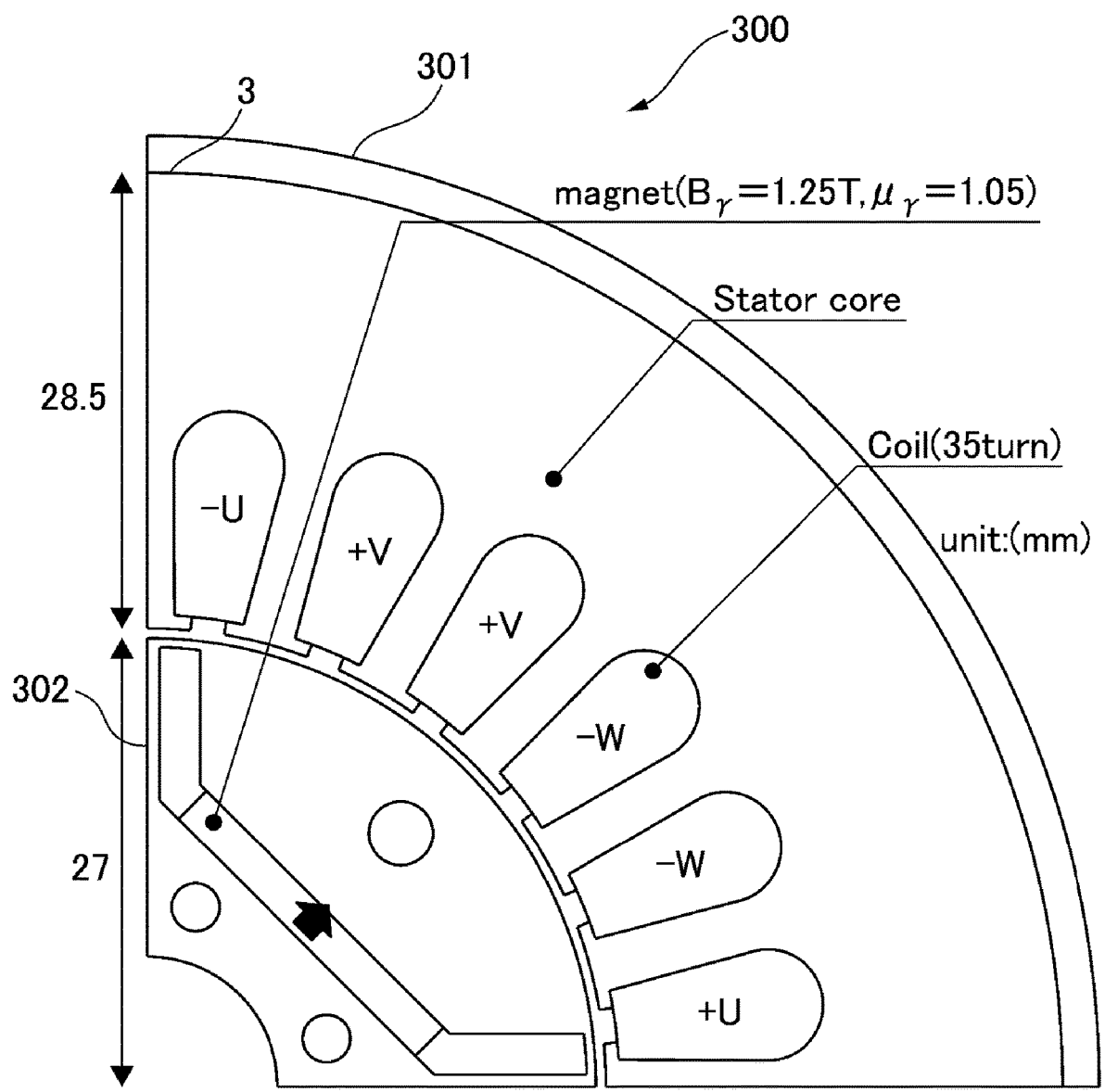

ROTATING ELECTRICAL MACHINE, STATOR CORE AND ROTOR CORE SET, METHOD FOR MANUFACTURING ROTATING ELECTRICAL MACHINE, METHOD FOR MANUFACTURING NON-ORIENTED ELECTRICAL STEEL SHEET FOR STATOR AND NON-ORIENTED ELECTRICAL STEEL SHEET FOR ROTOR, METHOD FOR MANUFACTURING STATOR AND ROTOR, AND NON-ORIENTED ELECTRICAL STEEL SHEET SET

TECHNICAL FIELD OF THE INVENTION

The present invention relates to a rotating electrical machine, a stator core and rotor core set, a method for manufacturing a rotating electrical machine, a method for manufacturing a non-oriented electrical steel sheet for a stator and a non-oriented electrical steel sheet for a rotor, a method for manufacturing a stator and a rotor, and a non-oriented electrical steel sheet set.

This application claims the right of priority based on Japanese Patent Application No. 2021-061620 filed with the Japan Patent Office on Mar. 31, 2021 and Japanese Patent Application No. 2021-094807 filed with the Japan Patent Office on Jun. 4, 2021, the contents of which are incorporated herein by reference.

RELATED ART

Various techniques for improving the characteristics of a motor whose stator core is accommodated in a casing are known. For example, in Non-Patent Document 1, it is described that the heat generated due to a copper loss of a coil wound around a teeth portion of a stator core is radiated from a casing disposed along the outer periphery of the stator core to the atmosphere or cooling water that flows through a cooling jacket via the stator core. Further, in Non-Patent Document 1, it is described that in a motor that is mounted on a vehicle, in a state where a high torque region is frequently used, such as when climbing a steep slope, and a copper loss is dominant, a temperature rise at a coil end with a long heat conduction path to the casing becomes a factor that limits the output of the motor.

In Non-Patent Documents 2 and 3, there are described techniques for improving a radiation characteristic from a coil end by cooling a motor by an ATF (Automatic Transmission Fluid) that lubricates a power electromotive part, a bearing, and the like, in order to suppress a temperature rise at the coil end.

Further, various techniques for forming a stator core of a motor by stacking steel sheets subjected to various forming processing such as punching and shaving are known. For example, in Patent Document 1, there is described a technique for removing a region corresponding to a range of 40% to 60% of a sheet thickness of a sheet material to be processed, by performing shaving, which removes an region corresponding to a range of 5% to 25% of the sheet thickness of the sheet material to be processed per time, on an end surface subjected to punching. According to the technique described in Patent Document 1, by removing a region corresponding to a predetermined ratio with respect to the sheet thickness of the sheet material to be processed, it is possible to obtain a rotating electrical machine core with a low iron loss without annealing the rotating electrical machine core. However, when removing a region corresponding to a predetermined ratio, a slight decrease in yield is unavoidable.

PRIOR ART DOCUMENT

Patent Document

[Patent Document 1] Japanese Patent No. 5598062

Non-Patent Document

[Non-Patent Document 1] "Study on High Power Density of HV Drive Motor", Munehiro Kamiya, Doctoral Thesis, 2008

[Non-Patent Document 2] "Thermal Analysis of Motor Cooling Structure Using ATF of Hybrid Electric Vehicle (HEV)", Sadahisa Onimaru, Hirohito Matsui, Tomonari Taguchi, Kenji Otaka, Eiji Ichioka, Tatsuhiko Mizutani, Society of Automotive Engineers of Japan, Academic Lecture preprint, No. 68-06, P.19-24, 2006

[Non-Patent Document 3] "Development of a new hybrid transmission for FWD sports Utility Vehicles", Hata, H., Kojima, M., Watanabe, H., Mizutani, T. et al., SAE Technical Paper 2005-01-0272, 2005

DISCLOSURE OF THE INVENTION

Problems to be Solved by the Invention

If a temperature rises due to an iron loss and a copper loss in a motor, since various problems such as occurrence of dielectric breakdown, demagnetization of a magnet, and an increases in copper loss more likely occur, it is preferable that windings, a stator core, and the like are cooled efficiently. Since the thermal conductivity or thermal diffusivity of the stator core is higher than the thermal conductivity or thermal diffusivity of air, most of the heat generated in the windings, the stator core, and the like is dissipated to the outside of the motor via the stator core. In a motor whose stator core is accommodated in a casing, since most of the heat generated at the windings, the stator core, and the like is dissipated via the casing, it is preferable that the heat conduction characteristic between the stator core and the casing is good.

On the other hand, if a rotor has a low thermal conductivity or a low thermal diffusivity, since an iron loss decreases due to a temperature rise, from this point of view, it is preferable that the thermal conductivity or the thermal diffusivity is low. There is no motor that takes advantage of the thermal conductivity or thermal diffusivity characteristic.

Therefore, an object of the present invention is to provide a technique for improving the efficiency of a motor while improving a heat conduction characteristic or a heat diffusion characteristic between a stator core and a casing by raising the thermal conductivity or thermal diffusivity of a stator with copper wires to prevent an increase in copper loss, and lowering the thermal conductivity or thermal diffusivity of a rotor to reduce an iron loss due to heat generation, Means for Solving the Problem The present invention has the following gist in order to solve the above problems.

(1) A first aspect of the present invention is a rotating electrical machine including a stator, a rotor, and a casing that accommodates the stator and the rotor, in which at least one of Condition 1: a thermal conductivity A of a non-oriented electrical steel sheet that is used for a core of the stator is in a range of 12 to 35 W/(m·K), a thermal conductivity B of a non-oriented electrical steel sheet that is used for a core of the rotor is in a range of 10 to 33 W/(m·K), and both the thermal conductivities have a relationship of an expression (1) of A>B, and Condition 2: a thermal diffusivity A1 of the non-oriented electrical steel sheet that is used for the core of the stator is in a range of $3.0 \times 10^{-6}$ to $9.0 \times 10^{-6}$ m$^2$/sW/(m·K), a thermal diffusivity B1 of the non-oriented electrical steel sheet that is used for the core of the rotor is in a range of $2.5 \times 10^{-6}$ to $8.5 \times 10^{-6}$ m$^2$/sW/(m·K), and both the thermal diffusivities have a relationship of an expression (3) of A1>B1 is satisfied.

(2) In the rotating electrical machine according to the above (1), the condition 1 may be satisfied.

(3) In the rotating electrical machine according to the above (1), the condition 2 may be satisfied.

(4) In the rotating electrical machine according to any one of the above (1) to (3), a chemical composition of each of the non-oriented electrical steel sheets that are used for the core of the stator and the core of the rotor may include, by mass %, C: 0.0100% or less, Si: 2.6% or more and 4.5% or less, Mn: 0.1% or more and 3.0% or less, P: 0.15% or less, S: 0.0030% or less, N: 0.0040% or less, Al: 0.1% or more and 2.0% or less, one or more selected from Sn and Sb: 0% to 0.200%, Cr: 0% to 0.400%, Ni: 0% to 5.0%, Cu: 0% to 5.0%, Ca: 0% to 0.010%, Mg: 0% to 0.0100%, a rare earth element (REM): 0% to 0.010%, B: 0% to 0.0050%, Ti: 0.0030% or less, O: 0.0200% or less, and a remainder consisting of Fe and impurities.

(5) In the rotating electrical machine according to the above (4), a value of an expression (2) below for the non-oriented electrical steel sheet that is used for the core of the stator may be lower than a value of the expression (2) for the non-oriented electrical steel sheet that is used for the core of the rotor.

$$9.9+12.4 \times Si(\text{mass \%})+6.6 \times Mn(\text{mass \%})+10.0 \times Al(\text{mass \%}) \quad \text{Expression (2)}$$

(6) In the rotating electrical machine according to the above (4) or (5), the chemical composition of the non-oriented electrical steel sheet may include P: less than 0.03% by mass %.

(7) In the rotating electrical machine according to any one of the above (4) to (6), the chemical composition of the non-oriented electrical steel sheet may include Cr: 0.001% to 0.400% by mass %, and satisfy an expression (4).

$$Cr(\text{mass \%}) \times O(\text{mass \%})<8.0 \times 10^{-5} \quad \text{Expression (4)}$$

(8) In the rotating electrical machine according to any one of the above (1) to (7), a grain size of the non-oriented electrical steel sheet that is used for the core of the rotor may be less than 80 μm.

(9) A second aspect of the present invention is a stator core and rotor core set that is used for the rotating electrical machine according to any one of the above (1) to (8).

(10) A third aspect of the present invention is a method for manufacturing a rotating electrical machine, including: manufacturing a rotating electrical machine by using the stator core and rotor core set according to the above (9).

(11) A fourth aspect of the present invention is a method for manufacturing a non-oriented electrical steel sheet for a stator and a non-oriented electrical steel sheet for a rotor of the rotating electrical machine according to the above (1), in which when a non-oriented electrical steel sheet in which a chemical composition includes, by mass %, C: 0.0100% or less, Si: 2.6% or more and 4.5% or less, Mn: 0.1% or more and 3.0% or less, P: 0.15% or less, S: 0.0030% or less, N: 0.0040% or less, Al: 0.1% or more and 2.0% or less, one or more selected from Sn and Sb: 0% to 0.200%, Cr: 0% to 0.400%, Ni: 0% to 5.0%, Cu: 0% to 5.0%, Ca: 0% to 0.010%, Mg: 0% to 0.0100%, a rare earth element (REM): 0% to 0.010%, B: 0% to 0.0050%, Ti: 0.0030% or less, O: 0.0200% or less, and a remainder consisting of Fe and impurities is manufactured by a process that include steelmaking, hot rolling, hot-rolled sheet annealing, pickling, cold rolling, and final annealing, two types of annealing temperatures for the final annealing are set and a final annealing temperature of the non-oriented electrical steel sheet for the rotor is set to a temperature in a range of 600° C. to 900° C., which is lower than a final annealing temperature of the non-oriented electrical steel sheet for the stator, such that at least one of an expression (1) of A>B and an expression (3) of A1>B1 is satisfied.

(12) In the method for manufacturing a non-oriented electrical steel sheet for a stator and a non-oriented electrical steel sheet for a rotor of the rotating electrical machine according to the above (11), the expression (1) may be satisfied.

(13) In the method for manufacturing a non-oriented electrical steel sheet for a stator and a non-oriented electrical steel sheet for a rotor of the rotating electrical machine according to the above (11), the expression (3) may be satisfied.

(14) In the method for manufacturing a non-oriented electrical steel sheet for a stator and a non-oriented electrical steel sheet for a rotor of the rotating electrical machine according to any one of the above (11) to (13), the chemical composition of the non-oriented electrical steel sheet may include P: less than 0.03% by mass %.

(15) In the method for manufacturing a non-oriented electrical steel sheet for a stator and a non-oriented electrical steel sheet for a rotor of the rotating electrical machine according to any one of the above (11) to (14), the chemical composition of the non-oriented electrical steel sheet may include Cr: 0.001% to 0.400% by mass %.

(16) A fifth aspect of the present invention is a method for manufacturing a stator and a rotor of the rotating electrical machine according to the above (1), including: manufacturing non-oriented electrical steel sheet in which a chemical composition includes, by mass %, C: 0.0100% or less, Si: 2.6% or more and 4.5% or less, Mn: 0.1% or more and 3.0% or less, P: 0.15% or less, S: 0.0030% or less, N: 0.0040% or less, Al: 0.1% or more and 2.0% or less, one or more selected from Sn and Sb: 0% to 0.200%, Cr: 0% to 0.400%, Ni: 0% to 5.0%, Cu: 0% to 5.0%, Ca: 0% to 0.010%, Mg: 0% to 0.0100%, a rare earth element (REM): 0% to 0.010%, B: 0% to 0.0050%, Ti: 0.0030% or less, O: 0.0200% or less, and a remainder consisting of Fe and impurities, by a process that include steelmaking, hot rolling, hot-rolled sheet annealing, pickling, cold rolling, and final annealing; punching out a material that is used for a stator and a material that is used for a rotor from the obtained non-oriented electrical steel sheet and stacking the materials; and performing stress relief annealing only on the stator such that at least one of an expression (1) of A>B and an expression (3) of A1>B1 is satisfied.

(17) In the method for manufacturing a stator and a rotor of the rotating electrical machine according to the above (16), the expression (1) may be satisfied.

(18) In the method for manufacturing a stator and a rotor of the rotating electrical machine according to the above (16), the expression (3) may be satisfied.

(19) In the method for manufacturing a stator and a rotor of the rotating electrical machine according to any one of the above (16) to (18), the chemical composition of the non-oriented electrical steel sheet may include P: less than 0.03% by mass %.

(20) In the method for manufacturing a stator and a rotor of the rotating electrical machine according to any one of the above (16) to (19), the chemical composition of the non-oriented electrical steel sheet may include Cr: 0.001% to 0.400% by mass %.

(21) A sixth aspect of the present invention is a non-oriented electrical steel sheet set that is used for a core material of a rotating electrical machine, in which at least one of Condition 1: a thermal conductivity A of a non-oriented electrical steel sheet for a stator is in a range of 12 to 35 W/(m·K), a thermal conductivity B of a non-oriented electrical steel sheet for a rotor is in a range of 10 to 33 W/(m·K), and both the thermal conductivities have a relationship of an expression (1) of A>B, and Condition 2: a thermal diffusivity A1 of the non-oriented electrical steel sheet for the stator is in a range of $3.0 \times 10^{-6}$ to $9.0 \times 10^{-6}$ m$^2$/sW/(m·K), a thermal diffusivity B1 of the non-oriented electrical steel sheet for rotor is in a range of $2.5 \times 10^{-6}$ to $8.5 \times 10^{-6}$ m$^2$/sW/(m·K), and both the thermal diffusivities have a relationship of an expression (3) of A1>B1 is satisfied.

(22) In the non-oriented electrical steel sheet set according to the above (21), the condition 1 may be satisfied.

(23) In the non-oriented electrical steel sheet set according to the above (21), the condition 2 may be satisfied.

(24) In the non-oriented electrical steel sheet set according to any one of the above (21) to (23), a chemical composition may include, by mass %, C: 0.0100% or less, Si: 2.6% or more and 4.5% or less, Mn: 0.1% or more and 3.0% or less, P: 0.15% or less, S: 0.0030% or less, N: 0.0040% or less, Al: 0.1% or more and 2.0% or less, one or more selected from Sn and Sb: 0% to 0.200%, Cr: 0% to 0.400%, Ni: 0% to 5.0%, Cu: 0% to 5.0%, Ca: 0% to 0.010%, Mg: 0% to 0.0100%, a rare earth element (REM): 0% to 0.010%, B: 0% to 0.0050%, Ti: 0.0030% or less, O: 0.0200% or less, and a remainder consisting of Fe and impurities.

Effects of the Invention

According to the present invention, it is possible to improve a motor efficiency while improving the heat conduction characteristic between a stator core and a casing.

BRIEF DESCRIPTION OF THE DRAWINGS

FIG. 1 is a partial plan view of a motor that is used in examples.

EMBODIMENTS OF THE INVENTION

Hereinafter, preferred embodiments of the present invention will be described in detail. Unless otherwise specified, the expression "a to b" for numerical values a and b means "a or more and b or less". In such an expression, in a case where a unit is attached only to the numerical value b, the unit is also applied to the numerical value a.

A first embodiment of the present invention is a rotating electrical machine having the following configuration.

The rotating electrical machine includes a stator, a rotor, and a casing that accommodates the stator and the rotor, in which a thermal conductivity A of a non-oriented electrical steel sheet that is used for a core of the stator is in a range of 12 to 35 W/(m·K), a thermal conductivity B of a non-oriented electrical steel sheet that is used for a core of the rotor is in a range of 10 to 33 W/(m·K), and both the thermal conductivities have a relational expression of an expression (1) of A>B.

Further, the first embodiment of the present invention also includes a stator core and rotor core set that is used in the rotating electrical machine.

Further, the first embodiment of the present invention includes a method for manufacturing a rotating electrical machine by using the stator core and rotor core set.

Hereinafter, the rotating electrical machine according to the present embodiment will be specifically described.

The rotating electrical machine according to the present embodiment has at least a stator, a rotor, and a casing that accommodates the stator and the rotor. The stator, the rotor, and the casing are not particularly limited with respect to the shapes and configurations thereof, and have normal shapes and configurations except for configurations described later (for example, a thermal conductivity, and a thermal diffusivity).

In the present embodiment, the non-oriented electrical steel sheet that is used for the core of the stator has a thermal conductivity A in a range of 12 to 35 W/(m·K), the non-oriented electrical steel sheet that is used for the core of the rotor has a thermal conductivity B in a range of 10 to 33 W/(m·K), and both the thermal conductivities satisfy a relationship of an expression (1) of A>B (Condition 1). Here, the thermal conductivity is the ratio of heat flux density to a temperature gradient.

In the present embodiment, the thermal conductivity of the non-oriented electrical steel sheet that is used for the core of the stator and the non-oriented electrical steel sheet that is used for the core of the rotor can be measured by the following method.

The measurement of the thermal conductivity is performed as follows by using samples that are obtained by disassembling a stator core and a rotor core from a rotating electrical machine into a plurality of core materials. In the present application, a thermal conductivity refers to a thermal conductivity at room temperature in an in-plane direction of a non-oriented electrical steel sheet that configures a core of a rotating electrical machine. Further, in a case where the non-oriented electrical steel sheet has an insulating film on the surface thereof, the measurement is performed with the insulating film present.

The thermal conductivity is not directly measured, but is obtained by the following expression.

Thermal conductivity=thermal diffusivity×specific heat×density

The thermal diffusivity is obtained by a laser flash method. Specifically, it is measured in the atmosphere by using a laser flash method thermophysical property measuring device LFA-502 manufactured by Kyoto Electronics Industry Co., Ltd. The shape of a sample at this time is a disk shape having a diameter of φ 10 mm and a sheet thickness, and at the time of measurement, the sample is measured in the state of a single steel sheet without stacking samples.

The specific heat is obtained by a differential scanning-type calorimeter method (DSC method). Specifically, it is measured in an Ar atmosphere by using DSC3500 Sirius manufactured by NETZSCH. The flow rate of an atmosphere gas is set to 50 mL/min. The shape of a sample at this time is a disk shape having a diameter of φ5 mm and a sheet thickness, and at the time of measurement, the sample is measured with two sheets of samples stacked.

The density is obtained by subtracting the volume from the mass of a sample for thermal diffusivity measurement. At this time, the thickness of the sample for thermal diffusivity measurement is obtained with a micrometer.

The thermal conductivity A of the non-oriented electrical steel sheet that is used for the core of the stator is in a range of 12 to 35 W/(m·K). If the thermal conductivity A is less than 12 W/(m·K), the temperature of the stator rises, causing an increase in copper loss, and if it exceeds 35 W/(m·K), it is necessary to reduce the amount of alloy in order to realize it, and this leads to an increase in iron loss. The thermal conductivity A is preferably in a range of 15 to 33 W/(m·K), and more preferably in a range of 17 to 26 W/(m·K).

The thermal conductivity B of the non-oriented electrical steel sheet that is used for the core of the rotor is in a range of 10 to 33 W/(m·K). If the thermal conductivity B is less than 10 W/(m·K), the heat generated by the rotor is transmitted to the stator via air or the like, causing an increase in copper loss, and if it exceeds 33 W/(m·K), it becomes difficult for the rotor itself to generate heat, and the iron loss reduction effect is not obtained. The thermal conductivity B is preferably in a range of 12 to 30 W/(m·K), and more preferably in a range of 15 to 24 W/(m·K).

In the present embodiment, it is important that the non-oriented electrical steel sheets that are used for the cores of the stator and the rotor have the thermal conductivity ranges described above and that both the thermal conductivities satisfy the relational expression of the expression (1) of A>B. In a case where both the thermal conductivities satisfy the relationship of the expression (1) of A>B, the thermal conductivity of the stator is larger than the thermal conductivity of the rotor, so that the temperature of the stator is easily released to the outside through the case or the like, and as a result, the temperature rise of the motor can be suppressed. At the same time, since the thermal conductivity of the rotor is smaller than the thermal conductivity of the stator, the temperature of the rotor raises more than that of the stator, and the iron loss occurring in the rotor is reduced. Due to these effects, the motor efficiency rises more than in the related art. It is more preferable to satisfy the relational expression of A>1.003×B.

On the other hand, in a case of A=B, the above effect is not obtained. Further, in a case where both the thermal conductivities are in the relationship of A<B, the temperature of the stator rises more easily than that of the rotor, and the temperature rise of the motor cannot be suppressed. At the same time, since the thermal conductivity of the rotor is larger than the thermal conductivity of the stator, the iron loss reduction effect due to the higher temperature of the rotor cannot be enjoyed.

As another aspect of the present invention, a configuration is also acceptable in which the thermal diffusivity A1 of the non-oriented electrical steel sheet that is used for the core of the stator is in a range of $3.0\times10^{-6}$ to $9.0\times10^{-6}$ m$^2$/sW/(m·K), the thermal diffusivity B1 of the non-oriented electrical steel sheet that is used for the core of the rotor is in a range of $2.5\times10^{-6}$ to $8.5\times10^{-6}$ m$^2$/sW/(m·K), and both the thermal diffusivities satisfy the relationship of an expression (3) of A1>B1 (Condition 2).

That is, by satisfying at least one of the conditions 1 and 2, it is possible to improve the efficiency of the motor.

The thermal diffusivity A1 of the non-oriented electrical steel sheet that is used for the core of the stator is in a range of $3.0\times10^{-6}$ to $9.0\times10^{-6}$ m$^2$/sW/(m·K).

If the thermal diffusivity A1 is less than $3.0\times10^{-6}$ m$^2$/sW/(m·K), the temperature of the stator rises, causing an increase in copper loss, and if it exceeds $9.0\times10^{-6}$ m$^2$/sW/(m·K), it is necessary to reduce the amount of alloy in order to realize it, and this leads to an increase in iron loss. The thermal diffusivity A1 is preferably in a range of $3.5\times10^{-6}$ to $8.5\times10^{-6}$ m$^2$/sW/(m·K), and more preferably in a range of $4.0\times10^{-6}$ to $8.0\times10^{-6}$ m$^2$/sW/(m·K).

The thermal diffusivity B1 of the non-oriented electrical steel sheet that is used for the core of the rotor is in a range of $2.5\times10^{-6}$ to $8.5\times10^{-6}$ m$^2$/sW/(m·K). If the thermal diffusivity B1 is less than $2.5\times10^{-6}$ m$^2$/sW/(m·K), the heat generated by the rotor is transmitted to the stator via air or the like, causing an increase in copper loss, and if it exceeds $8.5\times10^{-6}$ m$^2$/sW/(m·K), it becomes difficult for the rotor itself to generate heat, and the iron loss reduction effect is not obtained. The thermal diffusivity B1 is preferably in a range of $3.0\times10^{-6}$ to $8.0\times10^{-6}$ m$^2$/sW/(m·K), and more preferably in a range of $3.5\times10^{-6}$ to $7.5\times10^{-6}$ m$^2$/sW/(m·K).

It is important that the stator and the rotor have the thermal diffusivity ranges described above and both the thermal diffusivities satisfy the relational expression of the expression (3) of A1>B1. In a case where both the thermal diffusivities satisfy the relationship of the expression (3) of A1>B1, the thermal diffusivity of the stator is larger than the thermal diffusivity of the rotor, so that the temperature of the stator is easily released to the outside through the case or the like, and as a result, the temperature rise of the motor can be suppressed. At the same time, since the thermal diffusivity of the rotor is smaller than the thermal diffusivity of the stator, the temperature of the rotor raises more than in the stator, and the iron loss occurring in the rotor is reduced. Due to these effects, the motor efficiency rises more than in the related art. It is more preferable to satisfy the relational expression of A1>1.005×B1.

On the other hand, in a case of A1=B1, the above effect is not obtained. Further, in a case where both the thermal diffusivities are in the relationship of A1<B1, the temperature of the stator rises more easily than that of the rotor, and the temperature rise of the motor cannot be suppressed. At the same time, since the thermal diffusivity of the rotor is larger than the thermal diffusivity of the stator, the iron loss reduction effect due to the higher temperature of the rotor cannot be enjoyed.

It is more preferable that the thermal conductivity A of the non-oriented electrical steel sheet that is used for the core of the stator is in a range of 12 to 35 W/(m·K), the thermal conductivity B of the non-oriented electrical steel sheet that is used for the core of the rotor is in a range of 10 to 33 W/(m·K), and both the thermal conductivities satisfy the relationship of the expression (1) of A>B (Condition 1), and that the thermal diffusivity A1 of the non-oriented electrical steel sheet that is used for the core of the stator is in a range of $3.0\times10^{-6}$ to $9.0\times10^{-6}$ m/sW/(m·K), thermal diffusivity B1 of the non-oriented electrical steel sheet that is used for the core of the rotor is in a range of $2.5\times10^{-6}$ to $8.5\times10^{-6}$ m$^2$/sW/(m·K), and both the thermal diffusivities satisfy the relationship of the expression (3) of A1>B1 (Condition 2).

In this case, the heat of the stator is more easily released to the outside.

The relationship between the thermal conductivities or thermal diffusivities of the stator and rotor of the rotating electrical machine described above can be obtained, for example, by controlling the chemical compositions of the non-oriented electrical steel sheets that are used for the stator and the rotor.

That is, the chemical composition of each of these non-oriented electrical steel sheets includes, by mass %, C: 0.0100% or less, Si: 2.6% or more and 4.5% or less, Mn: 0.1% or more and 3.0% or less, P: 0.15% or less, S: 0.0030% or less, N: 0.0040% or less, Al: 0.1% or more and 2.0% or less, one or more selected from Sn and Sb: 0% to 0.200%, Cr: 0% to 0.400%, Ni: 0% to 5.0%, Cu: 0% to 5.0%, Ca: 0% to 0.010%, Mg: 0% to 0.0100%, a rare earth element (REM): 0% to 0.010%, B: 0% to 0.0050%, Ti: 0.0030% or less, O: 0.0200% or less, and a remainder consisting of Fe and impurities, and the value of the following expression (2) of the non-oriented electrical steel sheet that is used for the core of the stator is lower than the value of the following expression (2) of the non-oriented electrical steel sheet that is used for the core of the rotor.

$$9.9+12.4\times Si(\text{mass \%})+6.6\times Mn(\text{mass \%})+10.0\times Al(\text{mass \%}) \quad \text{Expression (2)}$$

C: 0.0100% or less

C is contained as an impurity. In order to reduce the iron loss, the content is set to preferably 0.0100% or less. The upper limit is more preferably 0.0025%, and further preferably 0.0020%.

Si: 2.6% or more and 4.5% or less

Si is an element that increases the strength of the steel sheet. Further, it is an element that increases the specific resistance and is contained to reduce the iron loss. Further, it is also effective in improving the strength of the steel sheet. From the viewpoint of this effect and prevention of a decrease in saturation magnetic flux density or embrittlement of steel, the content is set to preferably in a range of 2.6 to 4.5%. The lower limit is more preferably 2.8%, and further preferably 3.0%. The upper limit is more preferably 4.2%, and further preferably 4.0%.

Mn: 0.1% or more and 3.0% or less

Mn has the action of increasing the specific resistance, like Si and Al, and is contained to reduce the iron loss. Further, it is also an element that increases the strength of the steel sheet. From the viewpoint of this effect and prevention of a decrease in saturation magnetic flux density or embrittlement of steel, the content is set to preferably in a range of 0.1 to 3.0%. The lower limit is more preferably 0.6%, and further preferably 0.8%. The upper limit is more preferably 2.8%, and further preferably 2.5%.

P: 0.15% or less

P is an element that improves the strength of the steel sheet. Since the strength of the steel sheet can also be improved with Si or Mn, P does not need to be contained. From the viewpoint of preventing embrittlement of the steel sheet, the content is set to preferably 0.15% or less. The upper limit is more preferably 0.08%, further preferably 0.06%, and still further preferably 0.03%.

S: 0.0030% or less

S is contained as an impurity. In order to reduce the iron loss, the content is set to preferably 0.0030% or less. The upper limit is more preferably 0.0025%, and further preferably 0.0020%.

N: 0.0040% or less

Nitrogen (N) is an impurity. N decreases the magnetic characteristic after additional heat treatment. Therefore, the N content is 0.0040% or less. The N content is preferably 0.0020% or less.

Al: 0.1% or more and 2.0% or less

Al is an element that increases the specific resistance, like Si, and is contained to reduce the iron loss. Since the effect of reducing the iron loss can also be obtained even with Si, Al does not need to be contained. From the viewpoint of preventing a decrease in saturation magnetic flux density, the content is set to preferably 2.0% or less. The upper limit is more preferably 1.8%, and further preferably 1.5%.

One or more selected from Sn and Sb: 0% to 0.200%

Sn is an element that develops a preferred crystal orientation for the magnetic characteristic. Sn does not need to be contained, and the lower limit of the content is 0. Although the effect of containing Sn can be obtained even in a trace amount, the content is set to preferably 0.01% or more, and more preferably 0.02% or more, in order to reliably obtain the effect of containing Sn. From the viewpoint of preventing deterioration in magnetic characteristics, the upper limit of the content is set to preferably 0.200%, and more preferably 0.100%.

Sb is an element that develops a preferred crystal orientation for the magnetic characteristics. Sb does not need to be contained and the lower limit of the content is 0. Although the effect of containing Sb can be obtained even in a trace amount, the content is set to preferably 0.01% or more, and more preferably 0.02% or more, in order to reliably obtain the effect of containing Sb. From the viewpoint of preventing deterioration in magnetic characteristics, the upper limit of the content is set to preferably 0.200%, and more preferably 0.100%.

Cr: 0% to 0.400%

Cr is an element that improves corrosion resistance or a high-frequency characteristic. Cr does not need to be contained, and the lower limit of the content is 0. Although the effect of containing Cr can be obtained even in a trace amount, the content is set to preferably 0.01% or more, and more preferably 0.02% or more, in order to reliably obtain the effect of containing Cr. From the viewpoint of product cost, the upper limit of the content is 0.400%, preferably 0.300%, and more preferably 0.200%.

Further, when Cr is 0.001% or more, since the thermal conductivity and thermal diffusivity of the rotor and stator can be increased, the content is more preferable.

Ni: 0% to 5.0%

Ni is an element that increases the electric resistance of the steel sheet and reduces the iron loss. Ni does not need to be contained, and the lower limit of the content is 0. Although the effect of containing Ni can be obtained even in a trace amount, the content is set to preferably 0.01% or more, and more preferably 0.02% or more, in order to reliably obtain the effect of containing Ni. From the viewpoint of product cost, the upper limit of the content is 5.0%, preferably 0.5%, and more preferably 0.4%.

Cu: 0% to 5.0%

Cu is an element that increases the electric resistance of the steel sheet and reduces the iron loss. Cu does not need to be contained, and the lower limit of the content is 0. Although the effect of containing Cu can be obtained even in a trace amount, the content is set to preferably 0.01% or more, and more preferably 0.02% or more, in order to reliably obtain the effect of containing Cu. From the viewpoint of product cost and prevention of embrittlement of steel, the upper limit of the content is 5.0%, preferably 0.5%, and more preferably 0.4%.

Ca: 0% to 0.010%

Ca is an element that coarsens sulfides, improves growth of crystal grains in a heat treatment step, and contributes to a decrease in iron loss. Ca does not need to be contained, and the lower limit of the content is 0. Although the effect of containing Ca can be obtained even in a trace amount, the content is set to preferably 0.005% or more, and more preferably 0.0010% or more, in order to reliably obtain the effect of containing Ca. From the viewpoint of preventing deterioration in magnetic characteristics, the upper limit of the content is 0.010%, preferably 0.0050%, and more preferably 0.0030%.

Mg: 0% to 0.0100%

Mg is an element that reduces the iron loss through the action of promoting the growth of crystal grains, and is an element that converts sulfides in inclusions into harder inclusions containing Mg, thereby improving fatigue strength. In order to obtain this effect, the content is set to preferably a range of 0% to 0.0100% in consideration of cost. The lower limit is more preferably 0.0005%, and further preferably 0.0010%. The upper limit is more preferably 0.0040%, and further preferably 0.0030%.

Rare earth element (REM): 0% to 0.010%

A rare earth element (REM) is an element that coarsens sulfides, improves growth of crystal grains in a heat treatment step, and contributes to a decrease in iron loss. The rare earth element (REM) does not need to be contained, and the lower limit of the content is 0. Although the effect of containing the rare earth element (REM) can be obtained even in a trace amount, the content is set to preferably 0.005% or more, and more preferably 0.0010% or more, in order to reliably obtain the effect of containing the rare earth element (REM). From the viewpoint of preventing deterioration in magnetic characteristics, the upper limit of the content is 0.010%, preferably 0.0050%, and more preferably 0.0030%.

REM is an abbreviation for Rare Earth Metal, and refers to elements belonging to the Sc, Y, and lanthanide series.

Ti: 0.0030% or less

Ti is an element that is contained as an impurity. Ti combines with C, N, 0, or the like in base metal to form fine precipitates such as TiN, TiC, TiN, or Ti oxides, and inhibits the growth of crystal grains during annealing to deteriorate the magnetic characteristics, and therefore, the content is set to preferably 0.0030% or less. The upper limit is more preferably 0.0020%, and further preferably 0.0010%. Since Ti does not need to be contained, the lower limit of the content is 0. The lower limit may be set to 0.0003% or 0.0005% in consideration of refining cost.

B: 0% to 0.0050%

B contributes to an increase in thermal conductivity or thermal diffusivity with a small amount. Therefore, B may be contained. In a case of obtaining the above effect, the B content is set to preferably 0.0001% or more. Since B does not need to be contained, the lower limit of the content is 0.

On the other hand, if the B content exceeds 0.0050%, the compound of B inhibits grain growth during annealing, making a grain size finer and causing an increase in iron loss. Therefore, the B content is set to 0.0050% or less.

O: 0.0200% or less

O combines with Cr in steel to form $Cr_2O_3$. The $Cr_2O_3$ contributes to an increase in thermal conductivity or thermal diffusivity. Therefore, O may be contained. In a case of obtaining the above effect, the O content is set to preferably 0.0010% or more.

On the other hand, in a case where the O content exceeds 0.0200%, $Cr_2O_3$ inhibits grain growth during annealing, making a grain size finer and causing an increase in iron loss. Therefore, the O content is set to 0.0200% or less.

Further, it is preferable that the contents of Cr and O satisfy the following expression (4).

Expression (4): Cr (mass %)×O (mass %)<$8.0 \times 10^{-5}$ In a case where the expression (4) is not satisfied, $Cr_2O_3$ inhibits grain growth during annealing, making a grain size finer and causing an increase in iron loss. Therefore, it is preferable to satisfy the expression (4).

A remainder of the chemical composition is Fe and impurities. The term "impurity" refers to a component that is contained in a raw material, or a component that is mixed in during a manufacturing process and is not intentionally contained in the steel sheet.

The chemical composition of the base steel sheet described above may be measured by a general analysis method. For example, the steel component may be measured using ICP-AES (Inductively Coupled Plasma-Atomic Emission Spectrometry). For C and S, a combustion-infrared absorption method may be used, and for N, an inert gas fusion-thermal conductivity method may be used, and for O, a inert gas fusion-nondispersive infrared absorption method may be used.

The stator and rotor of the rotating electrical machine of the first embodiment are non-oriented electrical steel sheets having the above chemical composition, and the value of the following expression (2) of the non-oriented electrical steel sheet that is used for the core of the stator is lower than the value of the following expression (2) of the non-oriented electrical steel sheet that is used for the core of the rotor.

$$9.9+12.4 \times Si(\text{mass \%})+6.6 \times Mn(\text{mass \%})+10.0 \times Al (\text{mass \%}) \quad \text{Expression (2)}$$

The value of the expression (2) is closely related to the thermal conductivity (or thermal diffusivity) of the non-oriented electrical steel sheet that is obtained. That is, the expression (2) is a rough estimation of the resistance value of the non-oriented electrical steel sheet at room temperature. As for metal, free electrons are responsible for both electrical conduction and heat conduction (or heat diffusion), and the two are interrelated. The formulation of this relationship is the Wiedenmann-Franz law, which means that thermal conductivity (or thermal diffusivity) and a resistance value are inversely proportional at the same temperature.

Therefore, by controlling the chemical composition of each of the non-oriented electrical steel sheets that are used for the stator and rotor, and making the value of the expression (2) for the non-oriented electrical steel sheet that is used for the core of the stator lower than the value of the expression (2) for the non-oriented electrical steel sheet that is used for the core of the rotor, it is possible to more reliably obtain the relationship of the expression (1) of A>B of both the thermal conductivities.

In the first embodiment, a rotating electrical machine is manufactured using the rotor and the stator described above. In this way, both the stator and the rotor can have good magnetic characteristics, so that the efficiency of the motor can be improved.

A second embodiment of the present invention is a method for manufacturing a non-oriented electrical steel sheet for a rotor and a non-oriented electrical steel sheet for a stator that are used in the rotating electrical machine described in the first embodiment. The relationship between the thermal conductivities or thermal diffusivities of the stator and the rotor of the rotating electrical machine of the first embodiment can also be obtained by controlling a final annealing temperature in the process of manufacturing the non-oriented electrical steel sheets that are used for the stator and the rotor.

That is, the relationship between the thermal conductivities or thermal diffusivities of the stator and the rotor of the rotating electrical machine of the first embodiment can be obtained by setting two types of annealing temperatures for the final annealing and setting the final annealing temperature of the non-oriented electrical steel sheet for the rotor to a temperature in a range of 600° C. to 900° C., which is lower than the final annealing temperature of the non-oriented electrical steel sheet for the stator, such that the expression (1) of A>B or the expression (3) of A1>B1 is satisfied, when a non-oriented electrical steel sheet which includes, by mass %, C: 0.0100% or less, Si: 2.6% or more and 4.5% or less, Mn: 0.1% or more and 3.0% or less, P: 0.15% or less, S: 0.0030% or less, N: 0.0040% or less, Al: 0.1% or more and 2.0% or less, one or more selected from Sn and Sb: 0% to 0.200%, Cr: 0% to 0.400%, Ni: 0% to 5.0%, Cu: 0% to 5.0%, Ca: 0% to 0.010%, Mg: 0% to 0.0100%, a rare earth element (REM): 0% to 0.010%, B: 0% to 0.0050%, Ti: 0.0030% or less, O: 0.0200% or less, and a remainder consisting of Fe and impurities is manufactured by a process that include steelmaking, hot rolling, hot-rolled sheet annealing, pickling, cold rolling, and final annealing.

Therefore, a non-oriented electrical steel sheet set in which a thermal conductivity A of a non-oriented electrical steel sheet for a stator is in a range of 12 to 35 W/(m·K), a thermal conductivity B of a non-oriented electrical steel sheet for a rotor is in a range of 10 to 33 W/(m·K), and both the thermal conductivities satisfy a relationship of an expression (1) of A>B, or a non-oriented electrical steel sheet set in which a thermal diffusivity A1 of the non-oriented electrical steel sheet for the stator is in a range of $3.0 \times 10^{-6}$ to $9.0 \times 10^{-6}$ m²/sW/(m·K), a thermal diffusivity B1 of the non-oriented electrical steel sheet for the rotor is in a range of $2.5 \times 10^{-6}$ to $8.5 \times 10^{-6}$ m²/sW/(m·K), and both the thermal diffusivities satisfy a relationship of an expression (3) of A1>B1 is obtained.

The manufacturing method of the second embodiment of the present invention is performed by a process that include steelmaking, hot rolling, hot-rolled sheet annealing, pickling, cold rolling, final annealing, and skin pass rolling which is performed as necessary, and although the steps other than the final annealing described above are not particularly specified, the following conditions can be adopted in each process.

A standard condition in a range of 1000° C. to 1200° C. may be used as a slab heating temperature for the hot rolling. However, a coiling temperature is preferably 600° C. or lower, and more preferably 550° C. or lower, from the viewpoint of the toughness of the hot-rolled sheet.

Since the thickness of the hot-rolled sheet is advantageously as thin as possible to prevent cracking or fracture during pickling passing or cold rolling passing, the thickness of the hot-rolled sheet can be appropriately adjusted in view of the toughness of the hot-rolled sheet, production efficiency, and the like.

From the viewpoint of magnetism, it is preferable that the hot-rolled sheet annealing is performed at a temperature of 900° C. or higher and 1100° C. or lower for 30 seconds or longer and a grain size before cold rolling grain-grows to a grain size in a range of about 50 to 300 μm. However, since the ductility of the hot-rolled sheet is lowered, it is favorable if the conditions are determined in consideration of the component and productivity.

As for the final annealing after the cold rolling, two types of annealing temperatures are set according to the required thermal conductivity or thermal diffusivity. The final annealing temperature of the non-oriented electrical steel sheet for the rotor is set to a temperature in a range of 600° C. to 900° C., which is lower than the final annealing temperature of the non-oriented electrical steel sheet for the stator.

The final annealing temperature is closely related to the thermal conductivity or thermal diffusivity of the non-oriented electrical steel sheet which is obtained. That is, when the final annealing temperature of the non-oriented electrical steel sheet for the rotor is set to a temperature in a range of 600° C. to 900° C., which is lower than the final annealing temperature of the non-oriented electrical steel sheet for the stator, the grain size of the non-oriented electrical steel sheet for the rotor becomes finer, lattice defects (grain boundaries) in the steel increase, and the thermal conductivity or thermal diffusivity decreases. Therefore, by making the final annealing temperature of the non-oriented electrical steel sheet that is used for the rotor lower than the final annealing temperature of the non-oriented electrical steel sheet for the stator, it is possible to obtain the relationship of the expression (1) of A>B of both the thermal conductivities, or the relationship of the expression (3) of A1>B1 of both the thermal diffusivities.

In order to increase the strength and the magnetic characteristics, the grain size of the non-oriented electrical steel sheet for the rotor is set to preferably less than 80 ™, and more preferably less than 70 m. As for the grain size, the average value of the grain sizes measured by an intercept method in a sheet thickness direction and a rolling direction in a photograph of a longitudinal cross-sectional structure may be used. As the photograph of a longitudinal cross-sectional structure, an optical microscopic photograph can be used, and for example, a photograph taken at a magnification of 50 times may be used.

The final annealing temperature range of the non-oriented electrical steel sheet for the rotor is 600° C. to 900° C. If the final annealing temperature is lower than 600° C., since the strain introduced in the cold rolling remains and the steel sheet becomes brittle, it is not preferable. Further, if the final annealing temperature exceeds 900° C., since the grain size becomes coarse and the thermal conductivity or the thermal diffusivity becomes higher, it is not preferable. A particularly preferred range of the final annealing temperature of the non-oriented electrical steel sheet for the rotor is 750° C. to 850° C.

The relationship between the thermal conductivities or the thermal diffusivities of the stator and the rotor of the rotating electrical machine of the first embodiment can also be obtained by punching out a material that is used for the stator and a material that is used for the rotor from the non-oriented electrical steel sheets manufactured and obtained by the usual steps that include steelmaking, hot rolling, hot-rolled sheet annealing, pickling, cold rolling, and final annealing, and stacking the materials, and performing stress relief annealing only on the stator so as to satisfy the expression (1) of A>B or the expression (3) of A1>B1, even without controlling particularly the final annealing temperature in the manufacturing process of the non-oriented electrical steel sheets that are used for the stator and the rotor described above.

As for the stress relief annealing that is performed only on the stator after punching, it is preferable to perform annealing at a temperature in a range of 700° C. to 900° C. for 120 minutes or longer in order to release punching strain. In a case where strain is imparted by skin pass rolling, it is particularly preferable to perform annealing at a higher temperature for a longer time. In this manner, by appropriately performing the stress relief annealing only on the stator, it is possible to obtain the relationship of the expression (1) of A>B or the relationship of the expression (3) of Al>B1 in the stator and the rotor after the stress relief annealing.

EXAMPLES

Hereinafter, the embodiments of the present invention will be further described using examples.

The conditions used in the examples are examples of the conditions for confirmation thereof, and the present invention is not limited to these examples, and various conditions can be adopted without departing from the present invention as long as the object of the present invention is achieved.

FIG. 1 is a partial plan view of the motor. A motor 300 is an IPM motor manufactured based on the D model of the Institute of Electrical Engineers of Japan. A stator core 3 has an outer diameter of 112 mmφ, a rotor 302 has an outer diameter of 54 mmφ, and a stacking height of the stator core 3 is 100 mm. The number of slots is 24 slots. The stator core 3 is fixed to a casing 301 by shrink-fitting. The outer diameter of the rotor 302 is 54 mmφ, the inner diameter of the stator core 3 is 55 mmφ, and the gap between the rotor 302 and the stator core 3 is 0.5 mm. Further, the stator core 3 has an outer diameter of 112 mmφ (=54 mm+0.5 mm×2+28.5 mm×2).

The stator core has 24 slots, the number of windings per phase of a copper wire wound around a teeth portion of the stator core is 35 turns, and the magnetic flux density Br of a rotor magnet is 1.25 T.

In the present example, a loss generated in a motor when a winding current with a crest value of 3 A flowed at a phase angle of 30 degrees and the motor was driven at a rotation speed of 1500 RPM for 60 minutes was obtained as a motor loss (W).

Example 1

Molten steel was continuously cast to prepare a 250 mm thick slab having the chemical composition shown in Tables 1 and 2 below. Next, the slab was subjected to hot rolling to create a hot-rolled sheet. A slab reheating temperature at that time was 1200° C., a finish temperature in finish rolling was 850° C., a coiling temperature at the time of coiling was 650° C., and a finished sheet thickness was 2.0 mm. Next, in the hot-rolled sheet, as the hot-rolled sheet annealing, annealing was performed at the temperatures shown in Tables 1 and 2 for 1 minute, scale was removed by pickling, and cold rolling was performed to a thickness of 0.35 mm. Then, final annealing was performed at 800° C. for 30 seconds.

Next, an iron loss W15/50 (iron loss at maximum magnetic flux density of 1.5 T and a frequency of 50 Hz) of magnetic characteristics was measured. A test piece of 55 mm square was taken as a measurement sample, and the average value of the characteristics in a rolling direction and a width direction was obtained. The magnetic measurement was performed using a device capable of measuring the test piece of 55 mm square or a smaller test piece according to the electromagnetic circuit described in JIS C 2556 (2015). The measurement results are shown in Tables 1 and 2. Further, the thermal conductivity and the thermal diffusivity of the material were measured. The measurement method was the method described above.

As the materials used for each of the stator and the rotor of the motor, materials of A to X shown in Tables 1 and 2, and materials of A' to X' that materials having substantially the same composition and the same iron loss as the materials A to X and having a low thermal conductivity were prepared. In the materials of A' to X', the annealing temperature for the final annealing was set to be higher than the annealing temperature of each material of A to X. In A to X, a grain size was about 30 μm, and in A' to X', a grain size was about 40 μm.

The cores of the stator and the rotor were created from these materials, and motors were created. The materials used for the stator and the rotor, the establishment or non-establishment of the expressions (1) to (3), and the motor loss are shown in Tables 3 and 4. In the motors which are the invention examples, the motor loss was lower than other motors (comparative examples) using the same iron loss material.

In Comparative Examples 167 to 169, although the materials (W, W') had good iron loss, the thermal conductivity and the thermal diffusivity were out of the ranges in the present application, and in a case of being operated as a motor, heat built up, and the motor loss became worse. In particular, from Comparative Example 168, it can be seen that even if the expressions (1) and (3) are established, the motor loss becomes worse in a case where the thermal conductivity and the thermal diffusivity are out of the ranges in the present application.

TABLE 1

| Material No. | C mass % | Si mass % | Mn mass % | Al mass % | P mass % | S mass % | O mass % | Other mass % | Expression (2) | Sheet thickness mm | W15/50 W/kg | Thermal conductivity W/(m·K) | Thermal diffusivity $m^2$/sW/(m·K) |
|---|---|---|---|---|---|---|---|---|---|---|---|---|---|
| A  | 0.0018 | 2.69 | 0.20 | 0.30 | 0.011 | 0.0021 | 0.0022 | — | 47.6 | 0.35 | 9.1 | 24.76 | $6.87 \times 10^{-6}$ |
| A' | 0.0020 | 3.20 | 0.20 | 0.28 | 0.010 | 0.0017 | 0.0021 | — | 53.8 | 0.37 | 9.1 | 21.70 | $5.89 \times 10^{-6}$ |
| B  | 0.0018 | 4.08 | 0.21 | 0.29 | 0.010 | 0.0019 | 0.0019 | — | 64.8 | 0.35 | 8.7 | 17.58 | $4.77 \times 10^{-6}$ |
| B' | 0.0018 | 4.41 | 0.20 | 0.30 | 0.009 | 0.0020 | 0.0021 | — | 68.8 | 0.36 | 8.7 | 16.81 | $4.56 \times 10^{-6}$ |
| C  | 0.0021 | 2.71 | 0.19 | 1.50 | 0.009 | 0.0019 | 0.0022 | — | 59.7 | 0.35 | 8.9 | 19.24 | $5.31 \times 10^{-6}$ |
| C' | 0.0020 | 2.68 | 0.22 | 1.92 | 0.010 | 0.0018 | 0.0020 | — | 63.8 | 0.36 | 8.9 | 18.40 | $5.10 \times 10^{-6}$ |
| D  | 0.0018 | 3.49 | 2.49 | 1.48 | 0.010 | 0.0022 | 0.0019 | — | 84.5 | 0.35 | 8.4 | 13.84 | $3.81 \times 10^{-6}$ |
| D' | 0.0023 | 3.51 | 2.91 | 1.48 | 0.011 | 0.0021 | 0.0020 | — | 87.5 | 0.36 | 8.4 | 13.08 | $3.60 \times 10^{-6}$ |
| E  | 0.0095 | 2.69 | 0.20 | 0.30 | 0.011 | 0.0021 | 0.0020 | — | 47.6 | 0.35 | 9.4 | 24.80 | $6.73 \times 10^{-6}$ |
| E' | 0.0095 | 3.20 | 0.20 | 0.28 | 0.010 | 0.0017 | 0.0021 | — | 53.7 | 0.35 | 9.4 | 21.97 | $5.97 \times 10^{-6}$ |
| F  | 0.0018 | 2.69 | 0.11 | 0.30 | 0.011 | 0.0021 | 0.0022 | — | 47.0 | 0.35 | 9.2 | 25.12 | $6.82 \times 10^{-6}$ |
| F' | 0.0020 | 3.20 | 0.11 | 0.28 | 0.010 | 0.0017 | 0.0019 | — | 53.1 | 0.35 | 9.2 | 22.22 | $6.03 \times 10^{-6}$ |
| G  | 0.0018 | 2.69 | 0.20 | 0.30 | 0.144 | 0.0021 | 0.0018 | — | 47.6 | 0.35 | 8.8 | 24.80 | $6.73 \times 10^{-6}$ |
| G' | 0.0020 | 3.20 | 0.20 | 0.28 | 0.144 | 0.0017 | 0.0020 | — | 53.7 | 0.35 | 8.8 | 21.97 | $5.97 \times 10^{-6}$ |

TABLE 1-continued

| Material No. | C mass % | Si mass % | Mn mass % | Al mass % | P mass % | S mass % | O mass % | Other mass % | Expression (2) | Sheet thickness mm | W15/50 W/kg | Thermal conductivity W(m·K) | Thermal diffusivity m²/sW(m·K) |
|---|---|---|---|---|---|---|---|---|---|---|---|---|---|
| H | 0.0018 | 2.69 | 0.20 | 0.30 | 0.011 | 0.0028 | 0.0021 | — | 47.6 | 0.35 | 9.3 | 24.80 | $6.73 \times 10^{-6}$ |
| H' | 0.0020 | 3.20 | 0.20 | 0.28 | 0.010 | 0.0028 | 0.0018 | — | 53.7 | 0.35 | 9.3 | 21.97 | $5.97 \times 10^{-6}$ |
| I | 0.0018 | 2.69 | 0.20 | 0.30 | 0.011 | 0.0021 | 0.0019 | N: 0.0035 | 47.6 | 0.35 | 9.3 | 24.80 | $6.73 \times 10^{-6}$ |
| I' | 0.0020 | 3.20 | 0.20 | 0.28 | 0.010 | 0.0017 | 0.0022 | N: 0.0035 | 53.7 | 0.35 | 9.3 | 21.97 | $5.97 \times 10^{-6}$ |
| J | 0.0018 | 2.69 | 0.20 | 0.12 | 0.011 | 0.0021 | 0.0021 | — | 45.8 | 0.35 | 9.2 | 25.78 | $6.98 \times 10^{-6}$ |
| J' | 0.0020 | 3.20 | 0.20 | 0.12 | 0.010 | 0.0017 | 0.0019 | — | 52.1 | 0.35 | 9.2 | 22.65 | $6.14 \times 10^{-6}$ |
| K | 0.0018 | 2.69 | 0.20 | 0.30 | 0.011 | 0.0021 | 0.0021 | Sn: 0.195 | 47.6 | 0.35 | 8.8 | 24.80 | $6.73 \times 10^{-6}$ |
| K' | 0.0020 | 3.20 | 0.20 | 0.28 | 0.010 | 0.0017 | 0.0020 | Sn: 0.195 | 53.7 | 0.35 | 8.8 | 21.97 | $5.97 \times 10^{-6}$ |
| L | 0.0018 | 2.69 | 0.20 | 0.30 | 0.011 | 0.0021 | 0.0019 | Sb: 0.195 | 47.6 | 0.35 | 8.8 | 24.80 | $6.73 \times 10^{-6}$ |
| L' | 0.0020 | 3.20 | 0.20 | 0.28 | 0.010 | 0.0017 | 0.0020 | Sb: 0.195 | 53.7 | 0.35 | 8.8 | 21.97 | $5.97 \times 10^{-6}$ |

TABLE 2

| Material No. | C mass % | Si mass % | Mn mass % | Al mass % | P mass % | S mass % | O mass % | Other mass % | Expression (2) | Sheet thickness mm | W15/50 W/kg | Thermal conductivity W(m·K) | Thermal diffusivity m²/sW(m·K) |
|---|---|---|---|---|---|---|---|---|---|---|---|---|---|
| M | 0.0018 | 2.69 | 0.20 | 0.30 | 0.011 | 0.0021 | 0.0020 | Cr: 0.3500 | 47.6 | 0.35 | 8.8 | 24.80 | $6.73 \times 10^{-6}$ |
| M' | 0.0020 | 3.20 | 0.20 | 0.28 | 0.010 | 0.0017 | 0.0021 | Cr: 0.3500 | 53.7 | 0.35 | 8.8 | 21.97 | $5.97 \times 10^{-6}$ |
| N | 0.0018 | 2.69 | 0.20 | 0.30 | 0.011 | 0.0021 | 0.0022 | Ni: 4.67 | 47.6 | 0.35 | 8.8 | 24.80 | $6.73 \times 10^{-6}$ |
| N' | 0.0020 | 3.20 | 0.20 | 0.28 | 0.010 | 0.0017 | 0.0022 | Ni: 4.67 | 53.7 | 0.35 | 8.8 | 21.97 | $5.97 \times 10^{-6}$ |
| O | 0.0018 | 2.69 | 0.20 | 0.30 | 0.011 | 0.0021 | 0.0019 | Cu: 4.67 | 47.6 | 0.35 | 8.8 | 24.80 | $6.73 \times 10^{-6}$ |
| O' | 0.0020 | 3.20 | 0.20 | 0.28 | 0.010 | 0.0017 | 0.0019 | Cu: 4.67 | 53.7 | 0.35 | 8.8 | 21.97 | $5.97 \times 10^{-6}$ |
| P | 0.0018 | 2.69 | 0.20 | 0.30 | 0.011 | 0.0021 | 0.0021 | Ca: 0.0095 | 47.6 | 0.35 | 8.8 | 24.80 | $6.73 \times 10^{-6}$ |
| P' | 0.0020 | 3.20 | 0.20 | 0.28 | 0.010 | 0.0017 | 0.0022 | Ca: 0.0095 | 53.7 | 0.35 | 8.8 | 21.97 | $5.97 \times 10^{-6}$ |
| Q | 0.0018 | 2.69 | 0.20 | 0.30 | 0.011 | 0.0021 | 0.0020 | Mg: 0.0095 | 47.6 | 0.35 | 8.8 | 24.80 | $6.73 \times 10^{-6}$ |
| Q' | 0.0020 | 3.20 | 0.20 | 0.28 | 0.010 | 0.0017 | 0.0020 | Mg: 0.0095 | 53.7 | 0.35 | 8.8 | 21.97 | $5.97 \times 10^{-6}$ |
| R | 0.0018 | 2.69 | 0.20 | 0.30 | 0.011 | 0.0021 | 0.0021 | REM: 0.0095 | 47.6 | 0.35 | 8.8 | 24.80 | $6.73 \times 10^{-6}$ |
| R' | 0.0020 | 3.20 | 0.20 | 0.28 | 0.010 | 0.0017 | 0.0018 | REM: 0.0095 | 53.7 | 0.35 | 8.8 | 21.97 | $5.97 \times 10^{-6}$ |
| S | 0.0018 | 2.69 | 0.20 | 0.30 | 0.011 | 0.0021 | 0.0020 | Ti: 0.0026 | 47.6 | 0.35 | 9.3 | 24.80 | $6.73 \times 10^{-6}$ |
| S' | 0.0020 | 3.20 | 0.20 | 0.28 | 0.010 | 0.0017 | 0.0019 | Ti: 0.0026 | 53.7 | 0.35 | 9.3 | 21.97 | $5.97 \times 10^{-6}$ |
| T | 0.0018 | 2.69 | 0.20 | 0.30 | 0.011 | 0.0021 | 0.0019 | B: 0.0045 | 47.6 | 0.35 | 8.9 | 24.80 | $6.73 \times 10^{-6}$ |
| T' | 0.0020 | 3.20 | 0.20 | 0.28 | 0.010 | 0.0017 | 0.0020 | B: 0.0045 | 53.7 | 0.35 | 8.9 | 21.97 | $5.97 \times 10^{-6}$ |
| U | 0.0018 | 2.69 | 0.20 | 0.30 | 0.011 | 0.0021 | 0.0196 | — | 47.6 | 0.35 | 9.3 | 24.80 | $6.73 \times 10^{-6}$ |
| U' | 0.0020 | 3.20 | 0.20 | 0.28 | 0.010 | 0.0017 | 0.0196 | — | 53.7 | 0.35 | 9.3 | 21.97 | $5.97 \times 10^{-6}$ |
| V | 0.0018 | 2.69 | 0.20 | 0.30 | 0.011 | 0.0021 | 0.0051 | Cr: 0.0150 | 47.6 | 0.35 | 9.3 | 24.80 | $6.73 \times 10^{-6}$ |
| V' | 0.0020 | 3.20 | 0.20 | 0.28 | 0.010 | 0.0017 | 0.0050 | Cr: 0.0150 | 53.7 | 0.35 | 9.3 | 21.97 | $5.97 \times 10^{-6}$ |
| W | 0.0018 | 6.50 | 2.49 | 1.48 | 0.010 | 0.0022 | 0.0019 | — | 121.7 | 0.35 | 8.4 | 9.69 | $2.40 \times 10^{-6}$ |
| W' | 0.0023 | 6.00 | 2.91 | 1.48 | 0.011 | 0.0021 | 0.0021 | — | 118.3 | 0.36 | 8.4 | 10.20 | $2.81 \times 10^{-6}$ |
| X | 0.0018 | 2.69 | 0.20 | 1.38 | 0.011 | 0.0021 | 0.0020 | — | 58.4 | 0.35 | 8.8 | 20.21 | $5.57 \times 10^{-6}$ |
| X' | 0.0018 | 2.59 | 2.00 | 0.30 | 0.011 | 0.0021 | 0.0021 | — | 58.2 | 0.35 | 8.8 | 20.27 | $5.50 \times 10^{-6}$ |

TABLE 3

| Motor No. | Material used for stator | Material used for rotor | Expression (1) | Expression (2) | Expression (3) | Motor loss (W) | Remarks |
|---|---|---|---|---|---|---|---|
| Motor No. 101 | A | A | Non-established | Non-established | Non-established | 47.8 | Comparative example |
| Motor No. 102 | A' | A | Non-established | Non-established | Non-established | 48.1 | Comparative example |
| Motor No. 103 | A | A' | Established | Established | Established | 46.7 | Invention example |
| Motor No. 104 | B | B | Non-established | Non-established | Non-established | 45.9 | Comparative example |
| Motor No. 105 | B' | B | Non-established | Non-established | Non-established | 46.1 | Comparative example |
| Motor No. 106 | B | B' | Established | Established | Established | 44.7 | Invention example |
| Motor No. 107 | C | C | Non-established | Non-established | Non-established | 46.9 | Comparative example |
| Motor No. 108 | C' | C | Non-established | Non-established | Non-established | 47.2 | Comparative example |
| Motor No. 109 | C | C' | Established | Established | Established | 45.9 | Invention example |
| Motor No. 110 | D | D | Non-established | Non-established | Non-established | 44.7 | Comparative example |
| Motor No. 111 | D' | D | Non-established | Non-established | Non-established | 44.9 | Comparative example |
| Motor No. 112 | D | D' | Established | Established | Established | 42.8 | Invention example |
| Motor No. 113 | E | E | Non-established | Non-established | Non-established | 49.4 | Comparative example |
| Motor No. 114 | E' | E | Non-established | Non-established | Non-established | 49.7 | Comparative example |
| Motor No. 115 | E | E' | Established | Established | Established | 48.6 | Invention example |
| Motor No. 116 | F | F | Non-established | Non-established | Non-established | 48.3 | Comparative example |
| Motor No. 117 | F' | F | Non-established | Non-established | Non-established | 48.6 | Comparative example |
| Motor No. 118 | F | F' | Established | Established | Established | 47.5 | Invention example |
| Motor No. 119 | G | G | Non-established | Non-established | Non-established | 46.2 | Comparative example |
| Motor No. 120 | G' | G | Non-established | Non-established | Non-established | 46.5 | Comparative example |
| Motor No. 121 | G | G' | Established | Established | Established | 45.4 | Invention example |
| Motor No. 122 | H | H | Non-established | Non-established | Non-established | 48.9 | Comparative example |
| Motor No. 123 | H' | H | Non-established | Non-established | Non-established | 49.2 | Comparative example |
| Motor No. 124 | H | H' | Established | Established | Established | 48.1 | Invention example |
| Motor No. 125 | I | I | Non-established | Non-established | Non-established | 48.9 | Comparative example |
| Motor No. 126 | I' | I | Non-established | Non-established | Non-established | 49.2 | Comparative example |
| Motor No. 127 | I | I' | Established | Established | Established | 48.1 | Invention example |
| Motor No. 128 | J | J | Non-established | Non-established | Non-established | 48.3 | Comparative example |
| Motor No. 129 | J' | J | Non-established | Non-established | Non-established | 48.6 | Comparative example |
| Motor No. 130 | J | J' | Established | Established | Established | 47.5 | Invention example |
| Motor No. 131 | K | K | Non-established | Non-established | Non-established | 46.2 | Comparative example |
| Motor No. 132 | K' | K | Non-established | Non-established | Non-established | 46.5 | Comparative example |
| Motor No. 133 | K | K' | Established | Established | Established | 45.4 | Invention example |
| Motor No. 134 | L | L | Non-established | Non-established | Non-established | 46.2 | Comparative example |
| Motor No. 135 | L' | L | Non-established | Non-established | Non-established | 46.5 | Comparative example |
| Motor No. 136 | L | L' | Established | Established | Established | 45.4 | Invention example |

TABLE 4

| Motor No. | Material used for stator | Material used for rotor | Expression (1) | Expression (2) | Expression (3) | Motor loss (W) | Remarks |
|---|---|---|---|---|---|---|---|
| Motor No. 137 | M | M | Non-established | Non-established | Non-established | 46.2 | Comparative example |
| Motor No. 138 | M' | M | Non-established | Non-established | Non-established | 46.5 | Comparative example |
| Motor No. 139 | M | M' | Established | Established | Established | 45.4 | Invention example |
| Motor No. 140 | N | N | Non-established | Non-established | Non-established | 46.2 | Comparative example |
| Motor No. 141 | N' | N | Non-established | Non-established | Non-established | 46.5 | Comparative example |
| Motor No. 142 | N | N' | Established | Established | Established | 45.4 | Invention example |
| Motor No. 143 | O | O | Non-established | Non-established | Non-established | 46.2 | Comparative example |
| Motor No. 144 | O' | O | Non-established: | Non-established | Non-established | 46.5 | Comparative example |
| Motor No. 145 | O | O' | Established | Established | Established | 45.4 | Invention example |
| Motor No. 146 | P | P | Non-established | Non-established | Non-established | 46.2 | Comparative example |
| Motor No. 147 | P' | P | Non-established | Non-established | Non-established | 46.5 | Comparative example |
| Motor No. 148 | P | P' | Established | Established | Established | 45.4 | Invention example |
| Motor No. 149 | Q | Q | Non-established | Non-established | Non-established | 46.2 | Comparative example |
| Motor No. 150 | Q' | Q | Non-established | Non-established | Non-established | 46.5 | Comparative example |
| Motor No. 151 | Q | Q' | Established | Established | Established | 45.4 | Invention example |
| Motor No. 152 | R | R | Non-established | Non-established | Non-established | 46.2 | Comparative example |
| Motor No. 153 | R' | R | Non-established | Non-established | Non-established | 46.5 | Comparative example |
| Motor No. 154 | R | R' | Established | Established | Established | 45.4 | Invention example |
| Motor No. 155 | S | S | Non-established | Non-established | Non-established | 48.9 | Comparative example |
| Motor No. 156 | S' | S | Non-established | Non-established | Non-established | 49.2 | Comparative example |
| Motor No. 157 | S | S' | Established | Established | Established | 48.1 | Invention example |
| Motor No. 158 | T | T | Non-established | Non-established | Non-established | 46.7 | Comparative example |
| Motor No. 159 | T' | T | Non-established | Non-established | Non-established | 47.0 | Comparative example |
| Motor No. 160 | T | T' | Established | Established | Established: | 45.9 | Invention example |
| Motor No. 161 | U | U | Non-established | Non-established | Non-established | 48.9 | Comparative example |
| Motor No. 162 | U' | U | Non-established | Non-established | Non-established | 49.2 | Comparative example |
| Motor No. 163 | U | U' | Established | Established | Established | 48.1 | Invention example |

TABLE 4-continued

| Motor No. | Material used for stator | Material used for rotor | Expression (1) | Expression (2) | Expression (3) | Motor loss (W) | Remarks |
|---|---|---|---|---|---|---|---|
| Motor No. 164 | V | V | Non-established | Non-established | Non-established | 48.9 | Comparative example |
| Motor No. 165 | V' | V | Non-established | Non-established | Non-established | 49.2 | Comparative example |
| Motor No. 166 | V | V' | Established | Established | Established | 48.1 | Invention example |
| Motor No. 167 | W | W | Non-established | Non-established | Non-established | 81.1 | Comparative example |
| Motor No. 168 | W' | W | Established | Established | Established | 81.2 | Comparative example |
| Motor No. 169 | W | W' | Non-established | Non-established | Non-established | 81.5 | Comparative example |
| Motor No. 170 | X | X | Non-established | Non-established | Non-established | 48.1 | Comparative example |
| Motor No. 171 | X' | X | Established | Established | Non-established | 47.5 | Invention example |
| Motor No. 172 | X | X' | Non-established | Non-established | Established | 47.5 | Invention example |

Example 2

Final annealing was performed on the cold-rolled materials of the materials A, B, C, D, and M shown in Example 1 at the temperatures shown in Tables 5 and 6 for 30 seconds. The material A was used for motors 201 to 203 and motors 216 to 224, the material B was used for motors 204 to 206, the material C was used for motors 207 to 209, the material D was used for motors 210 to 212, and the material M was used for motors 213 to 215. The iron loss, thermal conductivity, thermal diffusivity, and motor loss of the material were obtained in the same manner as in Example 1. A material with a final annealing temperature of 600° C. had an average grain size of about 20 μm, a material with a final annealing temperature of 700° C. had an average grain size of about 25 μm, a material with a final annealing temperature of 800° C. had an average grain size of about 30 μm, a material with a final annealing temperature of 900° C. had an average grain size of about 65 μm, and a material with a final annealing temperature of 1000° C. had an average grain size of about 120 μm.

Motors 203, 206, 209, 212, 215, 218, 221, and 224 which are the invention examples had lower motor losses than other motors (comparative examples) using the same components.

TABLE 5

| | | C mass % | Si mass % | Mn mass % | Al mass % | P mass % | S mass % | O mass % | Cr mass % | Expression (2) | Sheet thickness mm | Final annealing temperature ° C. |
|---|---|---|---|---|---|---|---|---|---|---|---|---|
| Motor 201 | Stator 201 | 0.0018 | 2.69 | 0.20 | 0.30 | 0.011 | 0.0021 | 0.0022 | — | 47.6 | 0.35 | 800 |
| | Rotor 201 | 0.0018 | 2.69 | 0.20 | 0.30 | 0.011 | 0.0021 | 0.0022 | — | 47.6 | 0.35 | 800 |
| Motor 202 | Stator 202 | 0.0018 | 2.69 | 0.20 | 0.30 | 0.011 | 0.0021 | 0.0022 | — | 47.6 | 0.35 | 800 |
| | Rotor 202 | 0.0018 | 2.69 | 0.20 | 0.30 | 0.011 | 0.0021 | 0.0022 | — | 47.6 | 0.35 | 1000 |
| Motor 203 | Stator 203 | 0.0018 | 2.69 | 0.20 | 0.30 | 0.011 | 0.0021 | 0.0022 | — | 47.6 | 0.35 | 1000 |
| | Rotor 203 | 0.0018 | 2.69 | 0.20 | 0.30 | 0.011 | 0.0021 | 0.0022 | — | 47.6 | 0.35 | 800 |
| Motor 204 | Stator 204 | 0.0018 | 4.08 | 0.21 | 0.29 | 0.010 | 0.0019 | 0.0019 | — | 64.8 | 0.35 | 800 |
| | Rotor 204 | 0.0018 | 4.08 | 0.21 | 0.29 | 0.010 | 0.0019 | 0.0019 | — | 64.8 | 0.35 | 800 |
| Motor 205 | Stator 205 | 0.0018 | 4.08 | 0.21 | 0.29 | 0.010 | 0.0019 | 0.0019 | — | 64.8 | 0.35 | 800 |
| | Rotor 205 | 0.0018 | 4.08 | 0.21 | 0.29 | 0.010 | 0.0019 | 0.0019 | — | 64.8 | 0.35 | 1000 |
| Motor 206 | Stator 206 | 0.0018 | 4.08 | 0.21 | 0.29 | 0.010 | 0.0019 | 0.0019 | — | 64.8 | 0.35 | 1000 |
| | Rotor 206 | 0.0018 | 4.08 | 0.21 | 0.29 | 0.010 | 0.0019 | 0.0019 | — | 64.8 | 0.35 | 800 |
| Motor 207 | Stator 207 | 0.0021 | 2.71 | 0.19 | 1.50 | 0.009 | 0.0019 | 0.0022 | — | 59.7 | 0.35 | 800 |
| | Rotor 207 | 0.0021 | 2.71 | 0.19 | 1.50 | 0.009 | 0.0019 | 0.0022 | — | 59.7 | 0.35 | 800 |
| Motor 208 | Stator 208 | 0.0021 | 2.71 | 0.19 | 1.50 | 0.009 | 0.0019 | 0.0022 | — | 59.7 | 0.35 | 800 |
| | Rotor 208 | 0.0021 | 2.71 | 10.19 | 1.50 | 0.009 | 0.0019 | 0.0022 | — | 59.7 | 0.35 | 1000 |
| Motor 209 | Stator 209 | 0.0021 | 2.71 | 0.19 | 1.50 | 0.009 | 0.0019 | 0.0022 | — | 59.7 | 0.35 | 1000 |
| | Rotor 209 | 0.0021 | 2.71 | 0.19 | 1.50 | 0.009 | 0.0019 | 0.0022 | — | 59.7 | 0.35 | 800 |
| Motor 210 | Stator 210 | 0.0018 | 3.49 | 2.49 | 1.48 | 0.010 | 0.0022 | 0.0019 | — | 84.5 | 0.35 | 800 |
| | Rotor 210 | 0.0018 | 3.49 | 2.49 | 1.48 | 0.010 | 0.0022 | 0.0019 | — | 84.5 | 0.35 | 800 |

TABLE 5-continued

| | | | | | | | | | | | | |
|---|---|---|---|---|---|---|---|---|---|---|---|---|
| Motor 211 | Stator 211 | 0.0018 | 3.49 | 2.49 | 1.48 | 0.010 | 0.0022 | 0.0019 | — | 84.5 | 0.35 | 800 |
| | Rotor 211 | 0.0018 | 3.49 | 2.49 | 1.48 | 0.010 | 0.0022 | 0.0019 | — | 84.5 | 0.35 | 1000 |
| Motor 212 | Stator 212 | 0.0018 | 3.49 | 2.49 | 1.48 | 0.010 | 0.0022 | 0.0019 | — | 84.5 | 0.35 | 1000 |
| | Rotor 212 | 0.0018 | 3.49 | 2.49 | 1.48 | 0.010 | 0.0022 | 0.0019 | — | 84.5 | 0.35 | 800 |

| | | W15/50 W/kg | Thermal conductivity W(m·K) | Thermal diffusivity $m^2$/sW(m·K) | Expression (1) | Expression (3) | Motor loss W | Remarks |
|---|---|---|---|---|---|---|---|---|
| Motor 201 | Stator 201 | 9.1 | 24.76 | $6.87 \times 10^{-6}$ | Non-established | Non-established | 47.8 | Comparative example |
| | Rotor 201 | 9.1 | 24.76 | $6.87 \times 10^{-6}$ | | | | |
| Motor 202 | Stator 202 | 9.1 | 24.76 | $6.87 \times 10^{-6}$ | Non-established | Non-established | 30.6 | Comparative example |
| | Rotor 202 | 2.2 | 24.83 | $6.92 \times 10^{-6}$ | | | | |
| Motor 203 | Stator 203 | 2.2 | 24.83 | $6.92 \times 10^{-6}$ | Established | Established | 29.6 | Invention example |
| | Rotor 203 | 9.1 | 24.76 | $6.87 \times 10^{-6}$ | | | | |
| Motor 204 | Stator 204 | 8.7 | 17.52 | $4.77 \times 10^{-6}$ | Non-established | Non-established | 45.9 | Comparative example |
| | Rotor 204 | 8.7 | 17.52 | $4.77 \times 10^{-6}$ | | | | |
| Motor 205 | Stator 205 | 8.7 | 17.52 | $4.77 \times 10^{-6}$ | Non-established | Non-established | 29.6 | Comparative example |
| | Rotor 205 | 1.9 | 17.57 | $4.83 \times 10^{-6}$ | | | | |
| Motor 206 | Stator 206 | 1.9 | 17.57 | $4.83 \times 10^{-6}$ | Established | Established | 28.4 | Invention example |
| | Rotor 206 | 8.7 | 17.52 | $4.77 \times 10^{-6}$ | | | | |
| Motor 207 | Stator 207 | 8.9 | 19.24 | $5.31 \times 10^{-6}$ | Non-established | Non-established | 46.9 | Comparative example |
| | Rotor 207 | 8.9 | 19.24 | $5.31 \times 10^{-6}$ | | | | |
| Motor 208 | Stator 208 | 8.9 | 19.24 | $5.31 \times 10^{-6}$ | Non-established | Non-established | 30.3 | Comparative example |
| | Rotor 208 | 2.0 | 19.31 | $5.36 \times 10^{-6}$ | | | | |
| Motor 209 | Stator 209 | 2.0 | 19.31 | $5.36 \times 10^{-6}$ | Established | Established | 29.1 | Invention example |
| | Rotor 209 | 8.9 | 19.24 | $5.31 \times 10^{-6}$ | | | | |
| Motor 210 | Stator 210 | 8.4 | 13.82 | $3.81 \times 10^{-6}$ | Non-established | Non-established | 44.7 | Comparative example |
| | Rotor 210 | 8.4 | 13.82 | $3.81 \times 10^{-6}$ | | | | |
| Motor 211 | Stator 211 | 8.4 | 13.82 | $3.81 \times 10^{-6}$ | Non-established | Non-established | 27.2 | Comparative example |
| | Rotor 211 | 1.7 | 13.88 | $3.85 \times 10^{-6}$ | | | | |
| Motor 212 | Stator 212 | 1.7 | 13.88 | $3.85 \times 10^{-6}$ | Established | Established | 26.1 | Invention example |
| | Rotor 212 | 8.4 | 13.82 | $3.81 \times 10^{-6}$ | | | | |

TABLE 6

| | | C mass % | Si mass % | Mn mass % | Al mass % | P mass % | S mass % | O mass % | Cr mass % | Expression (2) | Sheet thickness mm | Final annealing temperature ° C. |
|---|---|---|---|---|---|---|---|---|---|---|---|---|
| Motor 213 | Stator 213 | 0.0018 | 2.69 | 0.20 | 0.30 | 0.011 | 0.0021 | 0.0020 | 0.35 | 47.6 | 0.35 | 800 |
| | Rotor 213 | 0.0018 | 2.69 | 0.20 | 0.30 | 0.011 | 0.0021 | 0.0020 | 0.35 | 47.6 | 0.35 | 800 |
| Motor 214 | Stator 214 | 0.0018 | 2.69 | 0.20 | 0.30 | 0.011 | 0.0021 | 0.0020 | 0.35 | 47.6 | 0.35 | 800 |
| | Rotor 214 | 0.0018 | 2.69 | 0.20 | 0.30 | 0.011 | 0.0021 | 0.0020 | 0.35 | 47.6 | 0.35 | 1000 |

TABLE 6-continued

| | | | | | | | | | | | |
|---|---|---|---|---|---|---|---|---|---|---|---|
| Motor 215 | Stator 215 | 0.0018 | 2.69 | 0.20 | 0.30 | 0.011 | 0.0021 | 0.0020 | 0.35 | 47.6 | 0.35 | 1000 |
| | Rotor 215 | 0.0018 | 2.69 | 0.20 | 0.30 | 0.011 | 0.0021 | 0.0020 | 0.35 | 47.6 | 0.35 | 800 |
| Motor 216 | Stator 216 | 0.0018 | 2.69 | 0.20 | 0.30 | 0.011 | 0.0021 | 0.0022 | — | 47.6 | 0.35 | 600 |
| | Rotor 216 | 0.0018 | 2.69 | 0.20 | 0.30 | 0.011 | 0.0021 | 0.0022 | — | 47.6 | 0.35 | 600 |
| Motor 217 | Stator 217 | 0.0018 | 2.69 | 0.20 | 0.30 | 0.011 | 0.0021 | 0.0022 | — | 47.6 | 0.35 | 600 |
| | Rotor 217 | 0.0018 | 2.69 | 0.20 | 0.30 | 0.011 | 0.0021 | 0.0022 | — | 47.6 | 0.35 | 1000 |
| Motor 218 | Stator 218 | 0.0018 | 2.69 | 0.20 | 0.30 | 0.011 | 0.0021. | 0.0022 | — | 47.6 | 0.35 | 1000 |
| | Rotor 218 | 0.0018 | 2.69 | 0.20 | 0.30 | 0.011 | 0.0021 | 0.0022 | — | 47.6 | 0.35 | 600 |
| Motor 219 | Stator 219 | 0.0018 | 2.69 | 0.20 | 0.30 | 0.011 | 0.0021 | 0.0022 | — | 47.6 | 0.35 | 700 |
| | Rotor 219 | 0.0018 | 2.69 | 0.20 | 0.30 | 0.011 | 0.0021 | 0.0022 | — | 47.6 | 0.35 | 700 |
| Motor 220 | Stator 220 | 0.0018 | 2.69 | 0.20 | 0.30 | 0.011 | 0.0021 | 0.0022 | — | 47.6 | 0.35 | 700 |
| | Rotor 220 | 0.0018 | 2.69 | 0.20 | 0.30 | 0.011 | 0.0021 | 0.0022 | — | 47.6 | 0.35 | 1000 |
| Motor 221 | Stator 221 | 0.0018 | 2.69 | 0.20 | 0.30 | 0.011 | 0.0021 | 0.0022 | — | 47.6 | 0.35 | 1000 |
| | Rotor 221 | 0.0018 | 2.69 | 0.20 | 0.30 | 0.011 | 0.0021 | 0.0022 | — | 47.6 | 0.35 | 700 |
| Motor 222 | Stator 222 | 0.0018 | 2.69 | 0.20 | 0.30 | 0.011 | 0.0021 | 0.0022 | — | 47.6 | 0.35 | 900 |
| | Rotor 222 | 0.0018 | 2.69 | 0.20 | 0.30 | 0.011 | 0.0021 | 0.0022 | — | 47.6 | 0.35 | 900 |
| Motor 223 | Stator 223 | 0.0018 | 2.69 | 0.20 | 0.30 | 0.011 | 0.0021 | 0.0022 | — | 47.6 | 0.35 | 900 |
| | Rotor 223 | 0.0018 | 2.69 | 0.20 | 0.30 | 0.011 | 0.0021 | 0.0022 | — | 47.6 | 0.35 | 1000 |
| Motor 224 | Stator 224 | 0.0018 | 2.69 | 0.20 | 0.30 | 0.011 | 0.0021 | 0.0022 | — | 47.6 | 0.35 | 1000 |
| | Rotor 224 | 0.0018 | 2.69 | 0.20 | 0.30 | 0.011 | 0.0021 | 0.0022 | — | 47.6 | 0.35 | 900 |

| | | W15/50 W/kg | Thermal conductivity W/(m·K) | Thermal diffusivity m²/s W/(m·K) | Expression (1) | Expression (3) | Motor loss W | Remarks |
|---|---|---|---|---|---|---|---|---|
| Motor 213 | Stator 213 | 8.8 | 24.81 | 6.91 × 10⁻⁶ | Non-established | Non-established | 44.5 | Comparative example |
| | Rotor 213 | 8.8 | 24.81 | 6.91 × 10⁻⁶ | | | | |
| Motor 214 | Stator 214 | 8.8 | 24.81 | 6.91 × 10⁻⁶ | Non-established | Non-established | 27.0 | Comparative example |
| | Rotor 214 | 2.1 | 24.86 | 6.96 × 10⁻⁶ | | | | |
| Motor 215 | Stator 215 | 2.1 | 24.86 | 6.96 × 10⁻⁶ | Established | Established | 25.9 | Invention example |
| | Rotor 215 | 8.8 | 24.81 | 6.91 × 10⁻⁶ | | | | |
| Motor 216 | Stator 216 | 9.5 | 24.69 | 6.81 × 10⁻⁶ | Non-established | Non-established | 48.2 | Comparative example |
| | Rotor 216 | 9.5 | 24.69 | 6.81 × 10⁻⁶ | | | | |
| Motor 217 | Stator 217 | 9.5 | 24.69 | 6.81 × 10⁻⁶ | Non-established | Non-established | 31.1 | Comparative example |
| | Rotor 217 | 2.2 | 24.83 | 6.92 × 10⁻⁶ | | | | |
| Motor 218 | Stator 218 | 2.2 | 24.83 | 6.92 × 10⁻⁶ | Established | Established | 29.9 | Invention example |
| | Rotor 218 | 9.5 | 24.69 | 6.81 × 10⁻⁶ | | | | |
| Motor 219 | Stator 219 | 9.3 | 24.72 | 6.83 × 10⁻⁶ | Non-established | Non-established | 48.0 | Comparative example |
| | Rotor 219 | 9.3 | 24.72 | 6.83 × 10⁻⁶ | | | | |
| Motor 220 | Stator 220 | 9.2 | 24.72 | 6.83 × 10⁻⁶ | Non-established | Non-established | 30.8 | Comparative example |
| | Rotor 220 | 2.2 | 24.83 | 6.92 × 10⁻⁶ | | | | |

TABLE 6-continued

| Motor | | Stator | 2.2 | 24.83 | 6.92 × 10⁻⁶ | Established | Established | 29.7 | Invention example |
|---|---|---|---|---|---|---|---|---|---|
| 221 | | 221 | | | | | | | |
| | | Rotor 221 | 9.3 | 24.72 | $6.83 \times 10^{-6}$ | | | | |
| Motor 222 | | Stator 222 | 5.1 | 24.79 | $6.89 \times 10^{-6}$ | Non-established | Non-established | 35.5 | Comparative example |
| | | Rotor 222 | 5.1 | 24.79 | $6.89 \times 10^{-6}$ | | | | |
| Motor 223 | | Stator 223 | 5.1 | 24.79 | $6.89 \times 10^{-6}$ | Non-established | Non-established | 30.3 | Comparative example |
| | | Rotor 223 | 2.2 | 24.83 | $6.92 \times 10^{-6}$ | | | | |
| Motor 224 | | Stator 224 | 2.2 | 24.83 | $6.92 \times 10^{-6}$ | Established | Established | 28.1 | Invention example |
| | | Rotor 224 | 5.1 | 24.79 | $6.89 \times 10^{-6}$ | | | | |

Example 3

As shown in Table 7, the materials A, B, C, D, and M used in Example 1 were used for the stator and rotor of the motor. Cores were punched out from these materials by punching processing, and stress relief annealing was performed under the conditions shown in Table 7. At this time, the stress relief annealing was performed at 800° C. for 2 hours. As for the conditions under which the stress relief annealing was performed, the stress relief annealing was also performed on test pieces for thermoelectric efficiency and iron loss measurement. The iron loss, thermal conductivity, thermal diffusivity, and motor loss of the material were obtained in the same manner as in Example 1. The average grain size of a material that was not subjected to the stress relief annealing was about 30 μm, and the average grain size of q material that was subjected to the stress relief annealing was about 120 μm.

Motors 303, 306, 309, 312, and 315 which are the invention examples had lower motor losses than other motors (comparative examples) using the same iron loss materials.

TABLE 7

| | Stator | | | | Rotor | | | | | | |
|---|---|---|---|---|---|---|---|---|---|---|---|
| Motor No. | Material | Stress relief annealing | Thermal conductivity W(m·K) | Thermal diffusivity m²/sW(m·K) | Material | Stress relief annealing | Thermal conductivity W(m·K) | Thermal diffusivity m²/sW(m·K) | Expression (1) | Expression (3) | Motor loss (W) | Remarks |
| Motor No. 301 | A | Without | 24.74 | $6.84 \times 10^{-6}$ | A | Without | 24.74 | $6.84 \times 10^{-6}$ | Non-established | Non-established | 47.8 | Comparative example |
| Motor No. 302 | A | Without | 24.74 | $6.84 \times 10^{-6}$ | A | With | 24.79 | $6.88 \times 10^{-6}$ | Non-established | Non-established | 30.1 | Comparative example |
| Motor No. 303 | A | With | 24.79 | $6.88 \times 10^{-6}$ | A | Without | 24.74 | $6.84 \times 10^{-6}$ | Established | Established | 28.9 | Invention example |
| Motor No. 304 | B | Without | 17.58 | $4.79 \times 10^{-6}$ | B | Without | 17.58 | $4.79 \times 10^{-6}$ | Non-established | Non-established | 45.9 | Comparative example |
| Motor No. 305 | B | Without | 17.58 | $4.79 \times 10^{-6}$ | B | With | 17.62 | $4.81 \times 10^{-6}$ | Non-established | Non-established | 29.1 | Comparative example |
| Motor No. 306 | B | With | 17.62 | $4.81 \times 10^{-6}$ | B | Without | 17.58 | $4.79 \times 10^{-6}$ | Established | Established | 29.0 | Invention example |
| Motor No. 307 | C | Without | 19.24 | $5.31 \times 10^{-6}$ | C | Without | 19.24 | $5.31 \times 10^{-6}$ | Non-established | Non-established | 46.9 | Comparative example |
| Motor No. 308 | C | Without | 19.24 | $5.31 \times 10^{-6}$ | C | With | 19.29 | $5.34 \times 10^{-6}$ | Non-established | Non-established | 29.8 | Comparative example |
| Motor No. 309 | C | With | 19.29 | $5.34 \times 10^{-6}$ | C | Without | 19.24 | $5.31 \times 10^{-6}$ | Established | Established | 28.7 | Invention example |
| Motor No. 310 | D | Without | 13.84 | $3.83 \times 10^{-6}$ | D | Without | 13.84 | $3.83 \times 10^{-6}$ | Non-established | Non-established | 44.7 | Comparative example |
| Motor No. 311 | D | Without | 13.84 | $3.83 \times 10^{-6}$ | D | With | 13.89 | $3.86 \times 10^{-6}$ | Non-established | Non-established | 26.9 | Comparative example |
| Motor No. 312 | D | With | 13.89 | $3.86 \times 10^{-6}$ | D | Without | 13.84 | $3.83 \times 10^{-6}$ | Established | Established | 25.8 | Invention example |
| Motor No. 313 | M | Without | 24.79 | $6.86 \times 10^{-6}$ | M | Without | 24.79 | $6.86 \times 10^{-6}$ | Non-established | Non-established | 47.1 | Comparative example |
| Motor No. 314 | M | Without | 24.79 | $6.86 \times 10^{-6}$ | M | With | 24.81 | $6.86 \times 10^{-6}$ | Non-established | Non-established | 29.5 | Comparative example |
| Motor No. 315 | M | With | 24.81 | $6.89 \times 10^{-6}$ | M | Without | 24.79 | $6.89 \times 10^{-6}$ | Established | Established | 28.2 | Invention example |

Brief Description of the Reference Symbols

3: stator core
300: motor
301: casing
302: rotor

What is claimed is:

1. A rotating electrical machine comprising:
a stator;
a rotor; and
a casing that accommodates the stator and the rotor,
wherein at least one of
Condition 1: a thermal conductivity A of a non-oriented electrical steel sheet that is used for a core of the stator is in a range of 12 to 35 W/(m·K), a thermal conductivity B of a non-oriented electrical steel sheet that is used for a core of the rotor is in a range of 10 to 33 W/(m·K), and both the thermal conductivities have a relationship of an expression (1) of A>B, and
Condition 2: a thermal diffusivity A1 of the non-oriented electrical steel sheet that is used for the core of the stator is in a range of $3.0 \times 10^{-6}$ to $9.0 \times 10^{-6}$ m$^2$/sW/(m·K), a thermal diffusivity B1 of the non-oriented electrical steel sheet that is used for the core of the rotor is in a range of $2.5 \times 10^{-6}$ to $8.5 \times 10^{-6}$ m$^2$/sW/(m·K), and both the thermal diffusivities have a relationship of an expression (3) of A1>B1
is satisfied,
a chemical composition of each of the non-oriented electrical steel sheets that are used for the core of the stator and the core of the rotor includes, by mass %,
C: 0.0100% or less,
Si: 2.6% or more and 4.5% or less,
Mn: 0.1% or more and 3.0% or less,
P: 0.15% or less,
S: 0.0030% or less,
N: 0.0040% or less,
Al: 0.1% or more and 2.0% or less,
one or more selected from Sn and Sb: 0% to 0.200%,
Cr: 0% to 0.400%,
Ni: 0% to 5.0%,
Cu: 0% to 5.0%,
Ca: 0% to 0.010%,
Mg: 0% to 0.0100%,
a rare earth element (REM): 0% to 0.010%,
B: 0% to 0.0050%,
Ti: 0.0030% or less,
O: 0.0200% or less, and
a remainder consisting of Fe and impurities, and
wherein a value of an expression (2) below for the non-oriented electrical steel sheet that is used for the core of the stator is lower than a value of the expression (2) for the non-oriented electrical steel sheet that is used for the core of the rotor $$9.9+12.4 \times Si(\text{mass \%})+6.6 \times Mn(\text{mass \%})+10.0 \times Al(\text{mass \%}) \quad \text{Expression (2)}.$$

2. The rotating electrical machine according to claim 1, wherein
the expression (1) of the Condition 1 is A>1.003×B, and the expression (3) of the Condition 2 is A1>1.005×B1.

3. The rotating electrical machine according to claim 1, wherein the condition 1 is satisfied.

4. The rotating electrical machine according to claim 1, wherein the condition 2 is satisfied.

5. The rotating electrical machine according to claim 1, wherein the chemical composition of the non-oriented electrical steel sheet includes P: less than 0.03% by mass %.

6. The rotating electrical machine according to claim 1, wherein the chemical composition of the non-oriented electrical steel sheet includes Cr: 0.001% to 0.400% by mass %, and satisfies an expression (4)

$$Cr(\text{mass \%}) \times O(\text{mass \%}) < 8.0 \times 10^{-5} \quad \text{Expression (4)}.$$

7. The rotating electrical machine according to claim 1, wherein a grain size of the non-oriented electrical steel sheet that is used for the core of the rotor is less than 80 μm.

8. A stator core and rotor core set that is used for the rotating electrical machine according to claim 1,
wherein at least one of
Condition 1: a thermal conductivity A of a non-oriented electrical steel sheet that is used for a core of the stator is in a range of 12 to 35 W/(m·K), a thermal conductivity B of a non-oriented electrical steel sheet that is used for a core of the rotor is in a range of 10 to 33 W/(m·K), and both the thermal conductivities have a relationship of an expression (1) of A>B, and
Condition 2: a thermal diffusivity A1 of the non-oriented electrical steel sheet that is used for the core of the stator is in a range of $3.0 \times 10^{-6}$ to $9.0 \times 10^{-6}$ m$^2$/sW/(m·K), a thermal diffusivity B1 of the non-oriented electrical steel sheet that is used for the core of the rotor is in a range of $2.5 \times 10^{-6}$ to $8.5 \times 10^{-6}$ m$^2$/sW/(m·K), and both the thermal diffusivities have a relationship of an expression (3) of A1>B1
is satisfied,
a chemical composition of each of the non-oriented electrical steel sheets that are used for the core of the stator and the core of the rotor includes, by mass %,
C: 0.0100% or less,
Si: 2.6% or more and 4.5% or less,
Mn: 0.1% or more and 3.0% or less,
P: 0.15% or less,
S: 0.0030% or less,
N: 0.0040% or less,
Al: 0.1% or more and 2.0% or less,
one or more selected from Sn and Sb: 0% to 0.200%,
Cr: 0% to 0.400%,
Ni: 0% to 5.0%,
Cu: 0% to 5.0%,
Ca: 0% to 0.010%,
Mg: 0% to 0.0100%,
a rare earth element (REM): 0% to 0.010%,
B: 0% to 0.0050%,
Ti: 0.0030% or less,
O: 0.0200% or less, and
a remainder consisting of Fe and impurities, and
wherein a value of an expression (2) below for the non-oriented electrical steel sheet that is used for the core of the stator is lower than a value of the expression (2) for the non-oriented electrical steel sheet that is used for the core of the rotor $$9.9+12.4 \times Si(\text{mass \%})+6.6 \times Mn(\text{mass \%})+10.0 \times Al(\text{mass \%}) \quad \text{Expression (2)}.$$

9. A method for manufacturing a non-oriented electrical steel sheet for a stator and a non-oriented electrical steel sheet for a rotor of the rotating electrical machine according to claim 1, wherein when a non-oriented electrical steel sheet in which a chemical composition includes, by mass %,
C: 0.0100% or less,
Si: 2.6% or more and 4.5% or less, Mn: 0.1% or more and 3.0% or less,
P: 0.15% or less,
S: 0.0030% or less,
N: 0.0040% or less,
Al: 0.1% or more and 2.0% or less,
one or more selected from Sn and Sb: 0% to 0.200%,
Cr: 0% to 0.400%,
Ni: 0% to 5.0%,
Cu: 0% to 5.0%,
Ca: 0% to 0.010%,
Mg: 0% to 0.0100%,
a rare earth element (REM): 0% to 0.010%,
B: 0% to 0.0050%,
Ti: 0.0030% or less,
O: 0.0200% or less, and
a remainder consisting of Fe and impurities is manufactured by a process that include steelmaking, hot rolling, hot-rolled sheet annealing, pickling, cold rolling, and final annealing, two types of annealing temperatures for the final annealing are set and a final annealing temperature of the non-oriented electrical steel sheet for the rotor is set to a temperature in a range of 600° C. to 900° C., which is lower than a final annealing temperature of the non-oriented electrical steel sheet for the stator, so that at least one of an expression (1) of A>B and an expression (3) of A1>B1 is satisfied, and
wherein a value of an expression (2) below for the non-oriented electrical steel sheet that is used for the stator is lower than a value of the expression (2) for the non-oriented electrical steel sheet that is used for the rotor $$9.9+12.4 \times Si(\text{mass \%})+6.6 \times Mn(\text{mass \%})+10.0 \times Al (\text{mass \%}) \quad \text{Expression (2)}.$$

10. The method for manufacturing a non-oriented electrical steel sheet for a stator and a non-oriented electrical steel sheet for the rotor of a rotating electrical machine according to claim 9, wherein
the expression (1) is A>1.003×B, and
the expression (3) is A1>1.005×B1.

11. The method for manufacturing a non-oriented electrical steel sheet for a stator and a non-oriented electrical steel sheet for the rotor of a rotating electrical machine according to claim 9, wherein the expression (1) is satisfied.

12. The method for manufacturing a non-oriented electrical steel sheet for a stator and a non-oriented electrical steel sheet for a rotor of the rotating electrical machine according to claim 9, wherein the expression (3) is satisfied.

13. The method for manufacturing a non-oriented electrical steel sheet for a stator and a non-oriented electrical steel sheet for the rotor of a rotating electrical machine according to claim 9, wherein the chemical composition of the non-oriented electrical steel sheet includes P: less than 0.03% by mass %.

14. The method for manufacturing a non-oriented electrical steel sheet for a stator and a non-oriented electrical steel sheet for a rotor of the rotating electrical machine according to claim 9, wherein the chemical composition of the non-oriented electrical steel sheet includes Cr: 0.001% to 0.400% by mass %.

15. A method for manufacturing a stator and a rotor of the rotating electrical machine according to claim 1, comprising:
manufacturing a non-oriented electrical steel sheet in which a chemical composition includes, by mass %,
C: 0.0100% or less,
Si: 2.6% or more and 4.5% or less,
Mn: 0.1% or more and 3.0% or less,
P: 0.15% or less,
S: 0.0030% or less,
N: 0.0040% or less,
Al: 0.1% or more and 2.0% or less,
one or more selected from Sn and Sb: 0% to 0.200%,
Cr: 0% to 0.400%,
Ni: 0% to 5.0%,
Cu: 0% to 5.0%,
Ca: 0% to 0.010%,
Mg: 0% to 0.0100%,
a rare earth element (REM): 0% to 0.010%,
B: 0% to 0.0050%,
Ti: 0.0030% or less,
O: 0.0200% or less, and
a remainder consisting of Fe and impurities, by a process that include steelmaking, hot rolling, hot-rolled sheet annealing, pickling, cold rolling, and final annealing;
punching out a material that is used for a stator and a material that is used for a rotor from the obtained non-oriented electrical steel sheet and stacking the materials; and
performing stress relief annealing only on the stator such that at least one of an expression (1) of A>B and an expression (3) of A1>B1 is satisfied, and
wherein a value of an expression (2) below for the material that is used for the stator is lower than a value of the expression (2) for the material that is used for the rotor $$9.9+12.4 \times Si(\text{mass \%})+6.6 \times Mn(\text{mass \%})+10.0 \times Al (\text{mass \%}) \quad \text{Expression (2)}.$$

16. The method for manufacturing a stator and a rotor according to claim 15, wherein
the expression (1) is A>1.003×B, and
the expression (3) is A1>1.005×B1.

17. The method for manufacturing a stator and a rotor of a rotating electrical machine according to claim 15, wherein the expression (1) is satisfied.

18. The method for manufacturing a stator and a rotor of a rotating electrical machine according to claim 15, wherein the expression (3) is satisfied.

19. The method for manufacturing a stator and a rotor of a rotating electrical machine according to claim 15, wherein the chemical composition of the non-oriented electrical steel sheet includes P: less than 0.03% by mass %.

20. The method for manufacturing a stator and a rotor of a rotating electrical machine according to claim 15, wherein the chemical composition of the non-oriented electrical steel sheet includes Cr: 0.001% to 0.400% by mass %.

21. A non-oriented electrical steel sheet set that is used for a stator and a rotor in a rotating electrical machine, wherein at least one of
Condition 1: a thermal conductivity A of a non-oriented electrical steel sheet for the stator is ranging from 12 to 35 W/(m·K), a thermal conductivity B of a non-oriented electrical steel sheet for the rotor is ranging from 10 to 33 W/(m·K), and A is greater than B, and
Condition 2: a thermal diffusivity A1 of the non-oriented electrical steel sheet for the stator is ranging from $3.0 \times 10^{-6}$ to $9.0 \times 10^{-6}$ m²/sW/(m·K), a thermal diffusivity B1 of the non-oriented electrical steel sheet for the rotor is ranging from $2.5 \times 10^{-6}$ to $8.5 \times 10^{-6}$ m²/sW/(m·K), and A1 is greater than B1
is satisfied,
wherein a chemical composition of each of the non-oriented electrical steel sheets that are used for the stator and the non-oriented electrical steel sheets that are used for the rotor includes, by mass %,
C: 0.0100% or less,
Si: 2.6% or more and 4.5% or less,
Mn: 0.1% or more and 3.0% or less,
P: 0.15% or less,
S: 0.0030% or less,
N: 0.0040% or less,
Al: 0.1% or more and 2.0% or less,
one or more selected from Sn and Sb: 0% to 0.200%,
Cr: 0% to 0.400%,
Ni: 0% to 5.0%,
Cu: 0% to 5.0%,
Ca: 0% to 0.010%,
Mg: 0% to 0.0100%,
a rare earth element (REM): 0% to 0.010%,
B: 0% to 0.0050%,
Ti: 0.0030% or less,
O: 0.0200% or less, and
a remainder consisting of Fe and impurities, and
wherein a value of an expression (2) below for the non-oriented electrical steel sheet that is used for the stator is lower than a value of the expression (2) for the non-oriented electrical steel sheet that is used for the rotor $$9.9+12.4\times Si(\text{mass \%})+6.6\times Mn(\text{mass \%})+10.0\times Al(\text{mass \%}) \quad \text{Expression (2)}.$$

22. The non-oriented electrical steel sheet set according to claim 21, wherein
the Condition 1 is A>1.003×B, and
the Condition 2 is A1>1.005×B1.

23. The non-oriented electrical steel sheet set according to claim 21, wherein the condition 1 is satisfied.

24. The non-oriented electrical steel sheet set according to claim 21, wherein the condition 2 is satisfied.

* * * * *